United States Patent
Fan et al.

(10) Patent No.: US 6,303,056 B1
(45) Date of Patent: Oct. 16, 2001

(54) COMPOSITE NONLINEAR OPTICAL FILM, METHOD OF PRODUCING THE SAME AND APPLICATIONS OF THE SAME

(76) Inventors: Bunsen Fan, 2529 Maple Ave., Peekskill, NY (US) 10507; Jianjun Xu, 833 E. Mobeck Ave. #C, West Covina, CA (US) 91790

( * ) Notice: Subject to any disclaimer, the term of this patent is extended or adjusted under 35 U.S.C. 154(b) by 0 days.

(21) Appl. No.: 09/621,836

(22) Filed: Jul. 24, 2000

Related U.S. Application Data

(63) Continuation-in-part of application No. 09/151,909, filed on Sep. 11, 1998, now Pat. No. 6,106,743.

(51) Int. Cl.$^7$ .............................. F21V 9/00; C09K 19/52; C09K 19/00
(52) U.S. Cl. .................... 252/582; 252/589; 252/299.01; 428/1.1
(58) Field of Search .............................. 252/299.01, 582, 252/589; 428/1.1; 359/328; 349/4; 430/302

(56) References Cited

U.S. PATENT DOCUMENTS

| | | |
|---|---|---|
| 4,759,820 | 7/1988 | Calvert et al. . |
| 5,028,109 * | 7/1991 | Lawandy ................................ 359/1 |
| 5,207,952 * | 5/1993 | Griffin, III ........................... 252/582 |
| 5,224,196 * | 6/1993 | Khanarian ............................ 385/122 |
| 5,256,784 * | 10/1993 | Francis et al. ........................ 544/294 |
| 5,288,426 * | 2/1994 | Itoh et al. ........................... 252/299.5 |
| 5,353,247 | 10/1994 | Faris . |
| 5,385,116 | 1/1995 | Hattori et al. . |
| 5,448,382 * | 9/1995 | Land et al. ............................. 359/43 |
| 5,489,451 * | 2/1996 | Omeis et al. .............................. 428/1 |
| 5,507,974 * | 4/1996 | Gompper et al. ................. 252/299.01 |
| 5,543,078 * | 8/1996 | Walba et al. ..................... 252/299.65 |
| 5,658,493 * | 8/1997 | Walba et al. ..................... 252/299.01 |
| 5,691,789 | 11/1997 | Li et al. . |
| 5,731,861 * | 3/1998 | Hatano et al. ........................ 349/169 |
| 5,737,044 * | 4/1998 | Van Haaren et al. .................. 349/61 |
| 5,793,456 * | 8/1998 | Broer et al. ............................. 349/98 |
| 5,796,454 * | 8/1998 | Ma ......................................... 349/98 |
| 5,838,653 | 11/1998 | Fan ..................................... 369/275.1 |
| 5,843,333 * | 12/1998 | Hakemi ............................. 252/299.5 |
| 5,858,268 * | 6/1999 | Niiyama et al. ................. 252/299.01 |
| 5,891,357 * | 4/1999 | Akashi et al. ................... 252/299.01 |
| 5,989,451 * | 11/1999 | Lemieux et al. .................. 252/299.1 |
| 6,033,774 * | 3/2000 | Yitzchaik et al. ..................... 428/333 |
| 6,051,669 * | 4/2000 | Attias ..................................... 526/248 |
| 6,106,743 * | 8/2000 | Fan ...................................... 252/582 |
| 6,138,772 * | 10/2000 | Ukon ................................ 252/299.61 |
| 6,139,771 * | 10/2000 | Walba et al. ..................... 252/299.01 |
| 6,141,367 | 10/2000 | Fan et al. ............................... 372/53 |

FOREIGN PATENT DOCUMENTS

| | | |
|---|---|---|
| 9-318807 | 12/1997 | (JP) . |
| WO 97/32224 | 9/1997 | (WO) . |

OTHER PUBLICATIONS

De Gennes, P.G. and Prost, J., *The Physics of Liquid Crystals*, (2nd ed.), pp. 1–3, Clarendon Press, Oxford (1993).

Hikmet, R.A.M. and Zwerver, B.H., 'Cholesteric gels formed by LC molecules and their use in optical storage,' *Liquid Crystals*, 13, 561 (1993), pp. 561–570.

* cited by examiner

*Primary Examiner*—Shean C. Wu
(74) *Attorney, Agent, or Firm*—Sampson & Associates

(57) ABSTRACT

A method is provided for fabricating composite nonlinear optical (NLO) organic films that are suited for use in NLO device applications. The highly NLO properties of these films arise from the vector alignment of 'guest' NLO molecules in a self-ordered nano-structured liquid crystal 'host' film. Field-poling is used to remove the centro-symmetry. The 'guest' concentration is increased by film processing to incorporate oriented nonlinear nano-crystallites to increase nonlinearity. NLO devices based on such films are of low cost and permit fast switching in a compact device format.

49 Claims, 13 Drawing Sheets

COMPOSITE NONLINEAR OPTICAL FILM, METHOD OF PRODUCING THE SAME AND APPLICATIONS OF THE SAME

RELATED APPLICATION

This application is a Continuation-In-Part of U.S. patent application Ser. No. 09/151,909 entitled Structurally Ordered Articles, Fabrication Method and Applications of the Same filed Sep. 11, 1998 now U.S. Pat. No. 6,106,743.

BACKGROUND OF INVENTION

FIELD OF THE INVENTION

The present invention relates to composite films and more particularly to composite films employing a novel preparation process for nonlinear-optics applications.

BACKGROUND INFORMATION

Throughout this application, various publications and patents are referred to by an identifying citation. The disclosures of the publications and patents referenced in this application are hereby incorporated by reference into the present disclosure.

Liquid crystals exist in a phase intermediate between a crystalline solid and an isotropic liquid. The molecules of these compounds are usually rod-shaped with long molecular axes called the directors. Liquid crystal phases are characterized by the long-range order (i.e., in the sense of a solid) of the molecules. The nematic phase is the simplest, having only orientational ordering such that their directors are approximately parallel. The cholesteric liquid crystal phase originates from the presence of chirality in the nematic phase. Liquid crystals have many applications. They are used as displays in digital wristwatches, calculators, panel meters, thermometers, computer displays and industrial products. They may be used to record, store, and display images which may be projected onto a large screen. They also have potential use as television displays. Moreover, films may be prepared from liquid crystals, in which the molecular ordering is frozen, i.e. by polymerization, to provide desired optical properties. For example, nematic and cholesteric (chiral nematic) films may be prepared to exhibit wavelength- and circular-polarization-selective reflectance/transmission (for cholesteric liquid crystal (CLC) films), and phase-shift transmission (for nematic liquid crystal (NLC) films). A drawback of many of these devices, however, is that without further processing, liquid crystal materials tend to be relatively expensive and relatively temperature sensitive. Also, these materials tend to disadvantageously absorb other materials, which may alter the properties of the component, etc. Moreover, while polymerized LCs may address some of these drawbacks, such LCs may be undesirable for many applications, due to, for example, inadequate mechanical properties (rigidity) and/or optical properties, (indices of refraction, characteristic wavelengths, etc.).

Moreover, bandwidth has become increasingly pressing requirement of modern communications systems. As fiber optics replaces electrical cabling, WDM and DWDM techniques are used to exploit more and more of the available fiber optic bandwidth. Simultaneously, packet-switched signal architectures are gradually replacing TDM techniques in many application sectors. However, as billions of dollars are invested in these efforts to expand bandwidth, one significant bottleneck remains—switching node (interconnect) hardware. Current interconnection devices require the data to be first converted to an electrical signal, routed to the correct output, and then re-converted to an optical signal. This opto-electronic interface introduces latencies and substantially reduces the overall bandwidth of the system. All-optical (i.e., without opto-electronic conversion) switching technologies utilizing MEMS (microelectromechanical system) or polarization-based technologies preserve the fiber bandwidth but switch slowly, introducing latencies that limit their applicability.

Nonlinear optical (NLO) materials offer rapid switching speeds. However, a need exists for an improved performance while overcoming the drawbacks associated with current NLO materials. For example, devices using inorganic NLO crystals such as titanium-diffused lithium niobate (Ti:LiNbO$_3$) tend to have inferior performance due to their weak NLO properties. In addition, temporal and thermal stability as well as radiation sensitivity are well-known problems. Furthermore, the inorganic crystal devices are difficult to integrate directly with electronics.

NLO devices based on thin films of poled organic polymers are viewed by many as a good solution, since such organic materials are low cost and readily processed. Hundreds of nonlinear organic materials have been synthesized and characterized, and devices using such materials have been demonstrated. However, these poled polymers have the following disadvantages: small second-order susceptibility, low optical damage threshold, high scattering losses, and limited temperature and temporal stability. Thus, poled NLO polymers still require a breakthrough in development to achieve practicality, despite the inherent advantages of the organic materials.

One way of taking advantage of thin film organics while overcoming these limitations is using NLO organic crystal films, which have a very high optical nonlinearity, higher damage threshold, and low scattering loss. U.S. Pat. No. 5,385,116 (Hattori et al, 1996) has reviewed various techniques for fabricating organic crystal films. However, significant manufacturability for practical devices remains. Until these problems are solved, the inherently superior organic NLO crystal materials cannot become useful.

Polymer composite containing NLO crystallites is another approach to obtain high-performance device materials. U.S. Pat. No. 4,759,820 (Calver et al, 1988) discloses processes to grow non-centro-symmetric crystallites, which can be either organic or inorganic, in a polymer matrix. The orientation of the crystallites is achieved by stretching, cold-drawing and other methods. A drawback of this technique is that it tends to be difficult to control the morphology, which is strongly dependent on the NLO material and the film processing.

Thus, a need exists for an improved optical film that exhibits large nonlinear optical effects while overcoming drawbacks of film devices.

SUMMARY OF THE INVENTION

According to one aspect of the present invention, an ordered optical film structure is fabricated by the steps of:

(a) providing a first material and a second material which are substantially non-reactive relative to one another, at least one of the first material and the second material being a liquid crystal;

(b) combining the first material with the second material to form a blend;

(c) forming a film with the blend, the film having a molecular ordering defined by the liquid crystal;

(d) freezing the molecular ordering of the film;

(e) removing one of the first material and the second material to form a matrix having a plurality of sites interspersed therethrough and a liquid crystalline molecular ordering; and (f) introducing a third material to the plurality of sites.

In a second aspect of the present invention, an ordered optical film structure comprises a substrate and a material disposed on the substrate, the material being a non-liquid crystal having a liquid crystalline molecular ordering.

In a third aspect of the present invention, an ordered optical film structure is fabricated by the steps of:

(a) providing a liquid crystal and a non-liquid crystal which are substantially non-reactive relative to one another;

(b) combining the liquid crystal with the non-liquid crystal to form a blend;

(c) forming a film with the blend, the film having a molecular ordering defined by the liquid crystal;

(d) freezing the molecular ordering of the film;

(e) removing one of the liquid crystal and the non-liquid crystal to form a matrix having a plurality of sites interspersed therethrough and a liquid crystalline molecular ordering.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 10$b$ illustrates molecular orderings of nematic liquid crystal films used in the inventive method, in an isotropic state in which the liquid crystal molecules are randomly oriented and the film is optically isotropic.

FIG. 12$b$ shows the absorption spectra of an NPP-doped nematic liquid crystal film having a liquid crystal ordering of an isotropic film whose absorption is polarization-independent.

DETAILED DESCRIPTION OF THE ILLUSTRATIVE EMBODIMENTS OF THE PRESENT INVENTION

Figure 1:
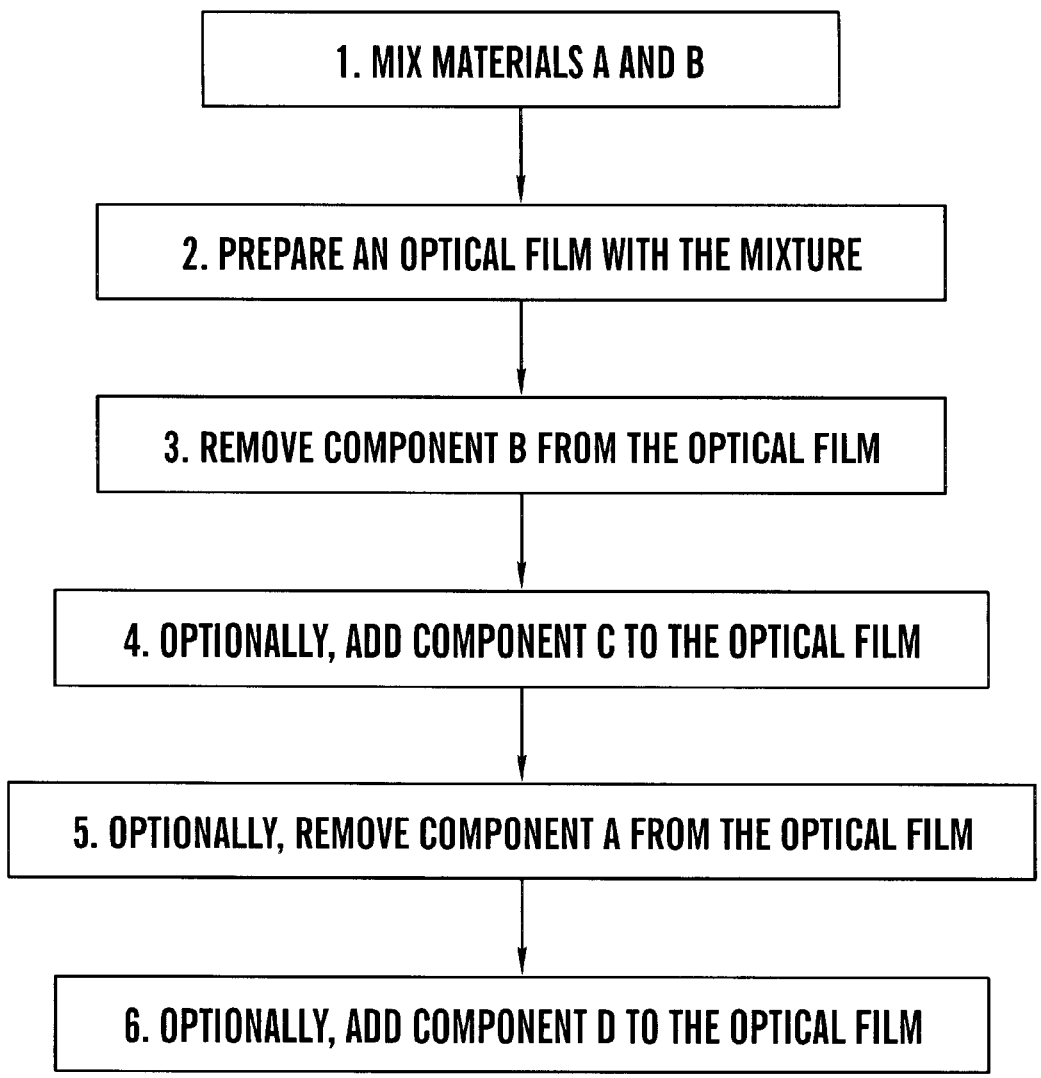
FIG. 1 is a preferred embodiment of steps for preparing optical films of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Figure 2A:
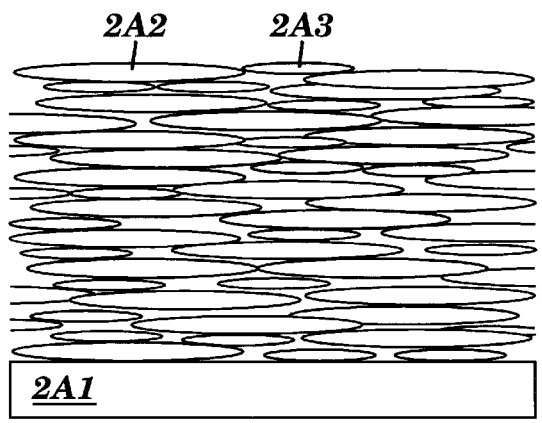
FIG. 2A is a cross-sectional schematic view (across the film thickness) of a structure of an aligned nematic film blend of materials A and B fabricated according to the steps of FIG. 1.
Figure 2B:
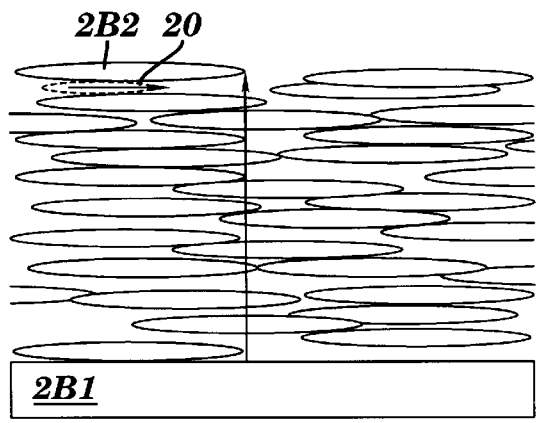
FIG. 2B is the same cross-sectional view illustrating schematically the structure for the film shown in FIG. 2A, after the material B is selectively removed, leaving only material A.
Figure 2C:
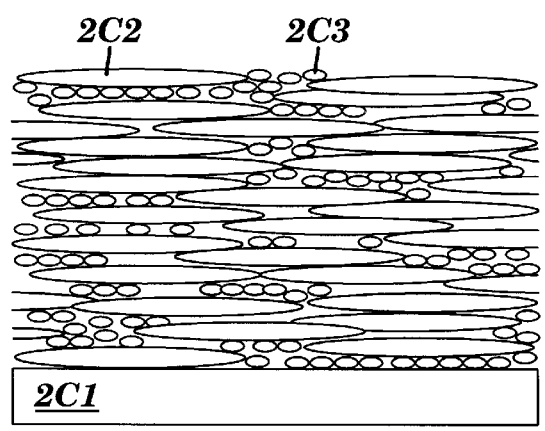
FIG. 2C shows the same cross-sectional view illustrating schematically the structure for the film shown in FIG. 2B, after a material C is added by filling the void left by the material B.
Figure 2D:
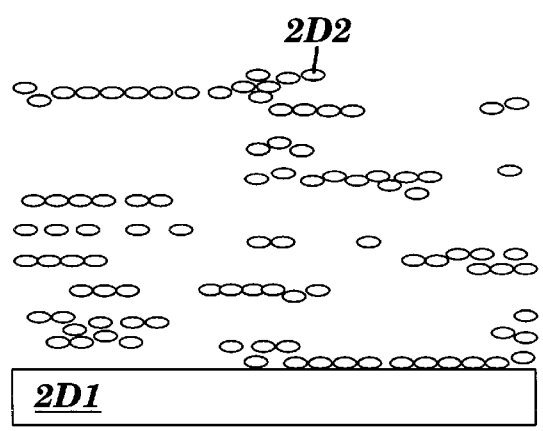
FIG. 2D shows the same cross-sectional view illustrating schematically the structure for the film shown in FIG. 2C, after the material A is selectively removed, leaving only material C.
Figure 2E:
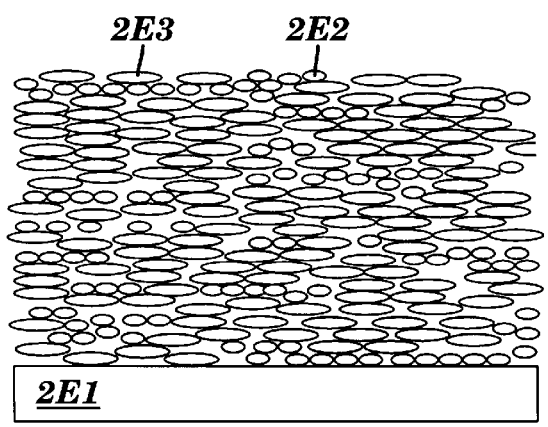
FIG. 2E shows the same cross-sectional view illustrating schematically the structure for the film shown in FIG. 2C, after a material D is added by filling the void left by the material A.
Figure 3:
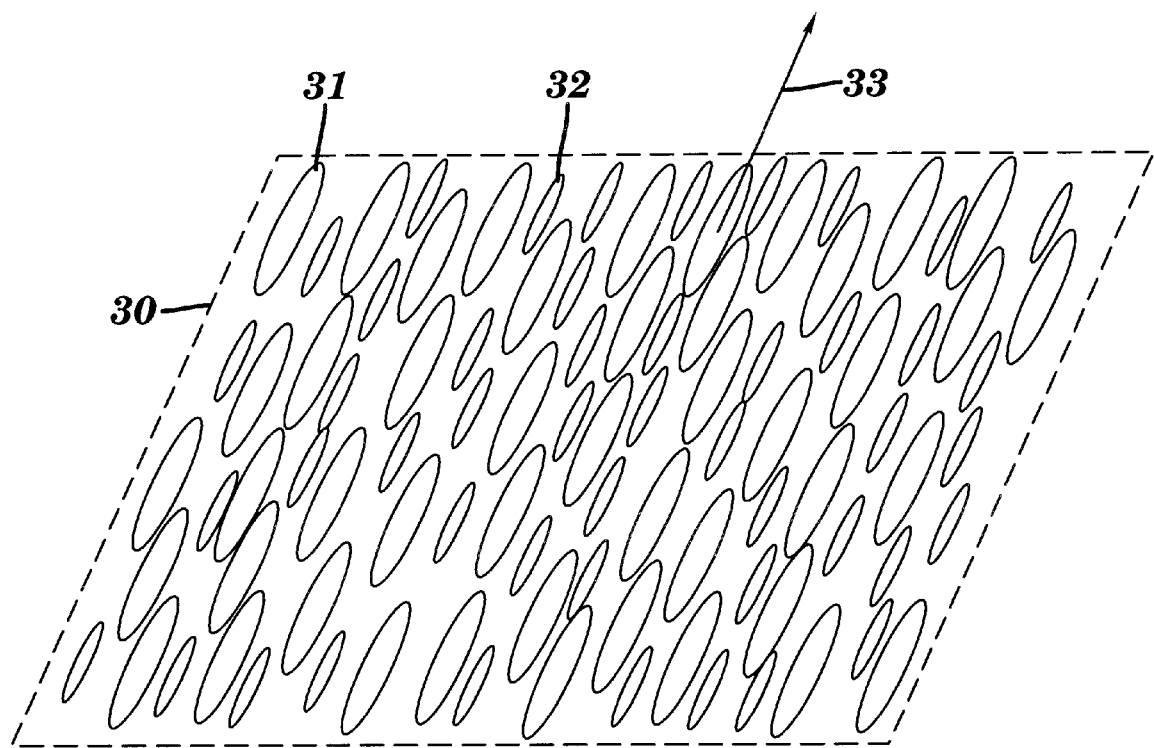
FIG. 3 shows a top view of a layer of aligned nematic film schematically showing component molecules aligned in one direction.

Referring to FIGS. 1–3, the present invention relates to film processing techniques. By utilizing the intrinsic 'self-assembling' or aligning process of liquid crystal (LC) molecules, an 'ordered' structure, for example, having nematic or cholesteric ordering, is obtained, as shown for example, in FIGS. 2A–3. The invention includes subtracting a constituent from a structure that includes a liquid crystal, to form a 'mold' (or polymer matrix if a polymer is used as the remaining component) on a molecular level. By adding and/or subtracting materials to or from the mold, a liquid crystal-like (i.e., liquid crystalline) structure may be obtained. This resulting structure is fabricated entirely, or at least partially, from non-LC material, while exhibiting some LC characteristics. The liquid crystal-like structure overcomes the drawbacks of LCs and may have some other advantageous properties.

As used herein, the term 'liquid crystal' or 'LC', means the class of materials in which a liquid-like order exists in at least one direction of space and in which some degree of anisotropy is present, as defined by DeGennes and Prost in *The Physics of Liquid Crystals,* (2nd ed.), pp. 1–3, Clarendon Press, 1993. Similarly, the term 'non-liquid crystal' or 'non-LC' as used herein, refers to substantially any material including monomers and/or polymers, which are not liquid crystals as defined herein. Suitable non-LC materials include substantially any materials capable of filling the voids as described herein. The non-LC material may be an organic or inorganic gas, liquid, a solution of small particles in a liquid or solid (after polymerization or other freezing. Examples of suitable non-LC materials include thermally or radiatively curable epoxies and acrylates. The term 'liquid crystal-like (i.e., liquid crystalline) molecular ordering' is defined herein as the long range molecular order characteristic of liquid crystals, such as, for example, nematic, smectic, and columnar or cholesteric ordering.

Referring now to FIGS. 1–8, the present invention will be more thoroughly described. Turning to FIG. 1, a preferred embodiment of the fabrication process of the optical devices of the present invention is shown.

In Step 1, materials A and B are substantially uniformly mixed. The material A is a liquid crystal, which may be either polymerizable or non-polymerizable. The material A itself may be a mixture of several materials. The materials B is a liquid crystal or a non-liquid crystal, which may be either polymerizable or non-polymerizable. The material B itself may be a mixture of several materials. In the event polymerizable materials are utilized, materials capable of being polymerized in any convenient manner, such as photo and/or thermal-induced polymerization or other means, may be utilized. For a photo-polymerizable material, a small amount of photo-initiator may be added to the blend. Typically, its concentration is a few percentage by weight. However, high photo-initiator concentrations may also be utilized. Materials A and B are 'non-reactive.' As used herein, the term 'non-reactive' has the same meaning as used by R. A. M Hikmet and B. H. Zwerver, in 'Cholesteric gels formed by LC molecules and their use in optical storage,' *Liquid Crystals,* vol 13, p561(1993), (the Hikmet/Zwerver paper) and others: no chemical reaction between the materials to form a different material.

Films with Blend A+B

In Step 2, an optical film is prepared with the blend, using well-known techniques for liquid crystals. The film is 'aligned' in the sense that the molecules of the blend are long-range ordered and the film exhibits its characteristic optical properties, for example, wavelength- and circular-polarization-selective reflectance for cholesteric liquid crystal (CLC) films, and phase-shift for nematic liquid crystal (NLC) films. FIG. 2A illustrates schematically the ordering for a nematic liquid crystal film consisting of materials A and B, whose elongated molecules are represented by ellipsoids of two sizes, 2A2 for material A and 2A3 for material B. The film is disposed on a substrate 2A1. For an aligned nematic film, the long axes of molecules are ordered more-or-less in parallel, resulting in a film that is optically birefringent. The refractive indices, taken along and perpendicular to the averaged direction of the molecular long axes, or the molecular director, are represented by $n_e$ and $n_o$, respectively. The optical birefringence $\Delta n=n_e-n_o$. For rod-shaped LC molecules, $n_e>n_o$ and the birefringence is termed 'positive.' For disc-shaped LC molecules, $n_e<n_o$ and the birefringence is termed 'negative.' The average index of refraction $n_{av}=(n_e+n_o)/2$.

The film prepared with aligned cholesteric liquid crystal has wavelength- and circular polarization-selective reflectance. The reflectance band is centered at $\lambda_C=n_{av}P_0$ and a bandwidth $\Delta\lambda/\lambda_C=\Delta n/n_{av}$, where $P_0$ is the helical pitch. Various novel phase retardation devices and others utilizing 'CLC-like' films obtained using process described below will be disclosed.

If at least one material of the blend (either material A or material B) is polymerizable, it may be advantageous to 'freeze' the molecular ordering by polymerization. Depending on the blending of materials A and B and conditions of polymerization process, the 'ordering' may be changed. For example, as disclosed by L. Li and S. M. Faris, 'Single-layer reflective super broadband circular polarizer and method of fabrication therefor,' U.S. Pat. 5,691,789 November 1997, (the Li/Faris patent) the reflectance band after polymerization may exhibit a significantly increased bandwidth over the reflectance band before the polymerization. This is attributed to a local compositional non-uniformity (in terms of relative concentration of materials A and B) across the film thickness direction that results in a continuously varied pitch formed during polymerization.

Although polymerization is a convenient method for 'freezing' the molecular ordering, various alternative techniques for freezing may be utilized. This freezing of the liquid crystal ordering may be achieved by changing the film temperature. For example, a film may be prepared with a blend consisting of materials A and B at a predetermined temperature. Additional film processing steps may be performed at a lower or higher temperature at which the ordered liquid crystal structure is maintained by one of the components, i.e., material A.

Process for (A+B)−B=A

In Step 3, the material B is removed, either partially or completely, from the film by some means, for example, dissolving with a suitable solvent or vaporizing with heat or evaporation under vacuum. The sites occupied by the removed material become vacant. These voids are elongated in shape, not necessarily uniform in size but are spatially ordered in a certain manner. For a nematic film, the voids are arranged such that the average direction of their long axes point parallel to the film plane (i.e., substantially parallel to the substrate surface plane) and perpendicular to the direction across the film (i.e., substantially perpendicular to the direction normal to the substrate).

FIG. 2B shows schematically the same cross-sectional view of the structure for the film shown in FIG. 2A, after the material B is selectively removed, leaving only material A, with some residual material B (not shown). The film is on a substrate 2B1. One of the sites vacated by the material B is represented by dashed lines at 20. The distribution or 'density' of the sites or voids 20 is proportional to the local density of the material B (in FIG. 2A). The voids 20 are relatively small and they are expected to be of microscopic scale (1/30 wavelength of incident light or smaller) and are connected to one another.

For a CLC film, the voids are arranged such that the average direction of their long axes in a film plane parallel to the substrate plane traces in a helical fashion across the film direction (normal to the substrate surface). After removal of the material B, the average index of refraction is smaller due to the presence of voids or empty sites 20. Other optical characteristics of the resulting film are also modified. For example, the wavelength- and circular-polarization-selective reflectance band is shifted to a shorter wavelength, and bandwidth is reduced for CLC films. The phase-shift $\Delta\phi$, that is equal to $\Delta nL$, where L is the thickness of the film, is reduced for nematic films.

Process for [(A+B)−B]+C=A+C

Step 4, may be optionally used to engineer desired properties, such as a particular operating temperature range, improved mechanical and/or chemical stability, etc., into the film structure. This step involves introducing a material C into the voids 20 of the film. This material C may be a liquid crystal or a non-liquid crystal that may be either polymerizable or non-polymerizable. Furthermore, the non-LC material C may be optically isotropic. The material C may be an organic or inorganic gas, liquid or solid, and it itself may be a mixture of several materials. For some applications, the material C may be the component B, minus some of its constituents. Typically, the component C is of low viscosity to facilitate its infiltration into the voids by capillary action. Placing the film with its surface coated with the component C in a vacuum chamber substantially increases the filling speed, as the air in the voids 20 is evacuated. If the material C is polymerizable, either by light, heat or other means, the film is polymerized to freeze the molecular ordering. The resulting film consists of the original material A and the added material C, and possibly material B (either as a residue, due to incomplete removal or deliberately introduced as a component of C). The optical characteristics of the resulting films are again modified. For example, the wavelength- and circular-polarization-selective reflectance band is shifted to a longer wavelength and bandwidth is modified (either broadened or narrowed) for CLC films, the phase-shift is modified (increased or reduced) for nematic films, depending on the material C.

Process for {[(A+B)−B]+C}−A=C

Step 5, is an additional optional step that may be used to further engineer desired properties, such as operating temperature range, and/or improved mechanical and/or chemical stability, etc., into the film structure. In this step, the material A is removed, either partially or completely, from the film by some means, for example, by selectively dissolving with a suitable solvent or etching with a suitable etchant. The sites occupied by the removed material A become vacant. These voids are elongated in shape, not necessarily uniform in size but are spatially ordered in a certain manner. For a CLC film, the voids are arranged such that the average direction of their long axes in the particular film plane (parallel to the substrate) traces in a helical fashion across the film direction (normal to the substrate surface). For a nematic film, the voids are arranged such that the average direction of their long axes in the particular film plane (parallel to the substrate surface) points in one direction across the film direction (normal to the substrate). The distribution or 'density' of the voids is proportional to the local density of the material A prior to removal. Notably, the resulting film is substantially of material C, which may be a non-liquid crystal but retains a liquid crystal-like structure that exhibits characteristic optical properties, for example, the wavelength- and circular-polarization- selective reflectance band for films initially having the so-called CLC ordering and the phase-shift for films initially having a nematic ordering. The resulting film thus may provide the desirable optical characteristics of CL films, without the disadvantages associated with LCs such as temperature sensitivity, etc.

Alternate Process (A+C)−A=C

Those skilled in the art will recognize that, a liquid crystal-like film of a non-liquid crystal material C may be obtained by first preparing a film with some materials A and C, then removing the material A from the film. For the purposes of step 5 above, it is assumed that an aligned liquid crystal film cannot be readily prepared directly from a blend of the particular materials A and C chosen.

Process for !{[(A+B)−B]+C}−A!+D=C+D

Step 6, is a still further optional step that may be used to further engineer desired properties, such as operating temperature range, and/or improved mechanical and/or chemical stability, etc., into the film structure. In this step, a material D is introduced in the voids of the film after the material A is removed. The component D may be a liquid crystal or a non-liquid crystal that may be either polymerizable or non-polymerizable. The material D may be a gas, liquid or solid and it itself may be a mixture of several materials. Typically, the component D is of low viscosity to facilitate its infiltration or permeation into the voids by capillary action. Placing the film with its surface coated with the component D in a vacuum chamber substantially increases the filling speed, as the air in the voids is evacuated. If the material D is polymerizable, either by light, heat or other means, the film is polymerized to 'freeze' the film structure. The resulting film consists of the materials C and D that may be either a liquid crystal or non-liquid crystal. The optical characteristics of the resulting film are again modified, for example, the center wavelength and the bandwidth of the wavelength- and circular-polarization-selective reflectance band is modified in the case of CLC-like films and birefringence is modified in the case of for nematic-like films.

Alternate Process [(A+C+D)−A]+C=C+D

Those skilled in the art will recognize that, a liquid crystal-like film of materials C and D may be obtained by first preparing a film with materials A, C and D, then removing the material A from the film and filling the voids with C or D. For illustrative purposes, it is assumed that an aligned liquid crystal film cannot be readily prepared directly from a blend of materials C and D.

ILLUSTRATIVE EXAMPLES

EXAMPLE I

Figure 4A:
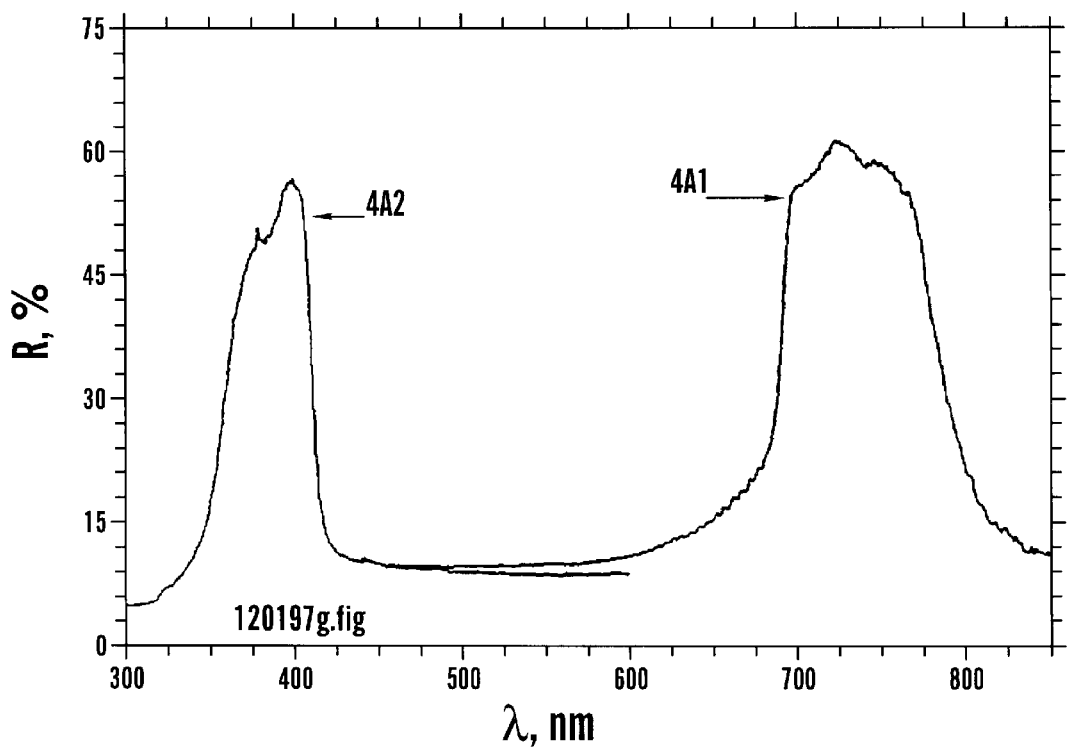
FIG. 4A shows experimental reflectance spectra of an illustrative CLC film sample, according to the inventive process.

FIG. 4A shows experimental reflectance spectra of film samples that were prepared in accordance of the invented process. Curve 4A1 is the reflectance spectrum of a planar CLC film of a blend consisting of a BASF acrylate CLC polymer #181 (45% by weight), a chiral nematic (53% by weight) and a small amount of Ciba-Geigy photo-initiator Irgacure 184 (2% by weight). The chiral nematic itself consisted of Merck low-molecular-weight nematic liquid crystal E44 and chiral dopant R1011 (0.7% by weight with respect to the chiral nematic). The film was 20 □m thick and was prepared in a conventional manner, i.e., two glass substrates were first spin-coated with a thin polyimide alignment layer which are mechanically rubbed. Glass beads of 20 □m in diameter were then dispersed between the two glass substrates, with the coated sides facing each other. The CLC blend was then introduced between the substrates by capillary action. After mechanically shearing (relatively small sideways motions of the substrates to force the LC molecules to align), the film was annealed at room temperature for 30 minutes (a process of letting the sample sit undisturbed and letting the intrinsic molecular force further align the molecules). The film was then photo-polymerized with an UV lamp. One of the substrates was removed. The reflectance 4A1 was taken from the 'naked' film side (the side without the glass substrate). In the context of foregoing discussion, material A was the BASF 181 polymer and material B was the low-molecular chiral nematic. A film with the blend (A+B) was thus prepared. The B-component (the low-molecular-weight chiral nematic) was subsequently removed by dissolving with acetone, resulting in a CLC-like film with material component A only. It is interesting to note that by re-introducing the component B (the chiral nematic Merck E44 and R1011) the reflectance spectrum was nearly identical to that of the original film. This indicates that the chiral nematic 're-occupies' the voids, making it nominally identical to the original. It demonstrates that material B refills the voids. The film had helically ordered voids that were occupied by the component B. Curve 4A2 shows the reflectance spectrum with introduction of an UV curable epoxy (Norland Products, Inc., Part No. 6101) to the voided film.

EXAMPLE II

Figure 4B:
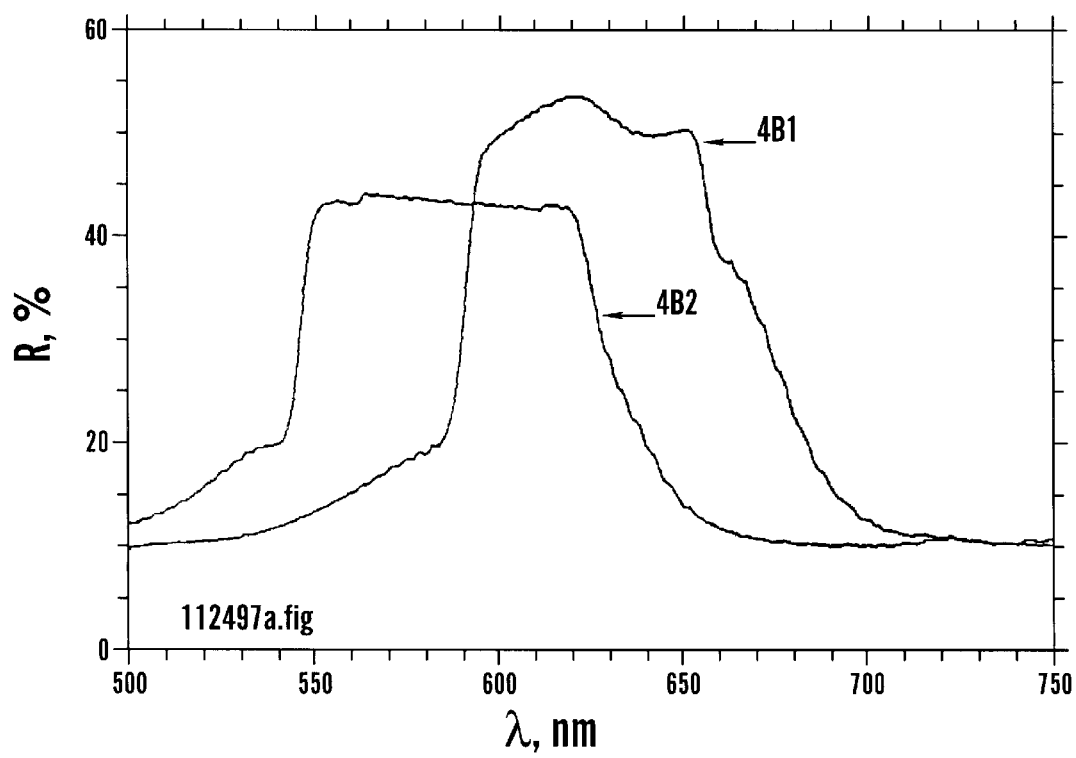
FIG. 4B shows experimental reflectance spectra of another illustrative CLC film sample, according to the inventive process.

FIG. 4B shows experimental reflectance spectra of film samples that were prepared in accordance with the invented process. Curve 4B1 was the spectrum of a planar CLC film of the blend consisting of a BASF acrylate CLC polymer #181 (26% by weight), a chiral nematic (69% by weight) and a small amount of Ciba-Geigy photo-initiator Irgacure 184 (5% by weight). The chiral nematic itself consisted of Merck low-molecular-weight nematic liquid crystal E44 and chiral dopant CB15 (24.4% by weight with respect to the chiral nematic). The film was 20 □m thick and was prepared in a similar manner described above with respect to Example I. After the film sample was photo-polymerized with a UV lamp and one of the substrates was removed, the reflectance 4A1 was taken from the 'naked' film side. In the context of foregoing discussion, A was the BASF 181 polymer, B was the low-molecular chiral nematic. A film with the blend (A+B) was prepared. The B-component (the low-molecular-weight chiral nematic) was subsequently removed by dissolving with acetone, resulting in a CLC-like film with material component A only. The film had helically ordered voids that were occupied by the component B. It is interesting to note that by re-introducing the component B (chiral nematic Merck E44 and CB15) the reflectance spectrum (not shown) was nearly identical to that of the original film. Curve 4B2 shows the reflectance spectrum with introduction of Merck E44 alone to the voided film. The reflectance spectrum was different from the original reflectance spectrum. This difference may be attributed to the difference in birefringence and in average index of refraction $n_{av}$ of the voids originally occupied by CB15 which are subsequently filled with E44.

EXAMPLE III

Figure 4C:
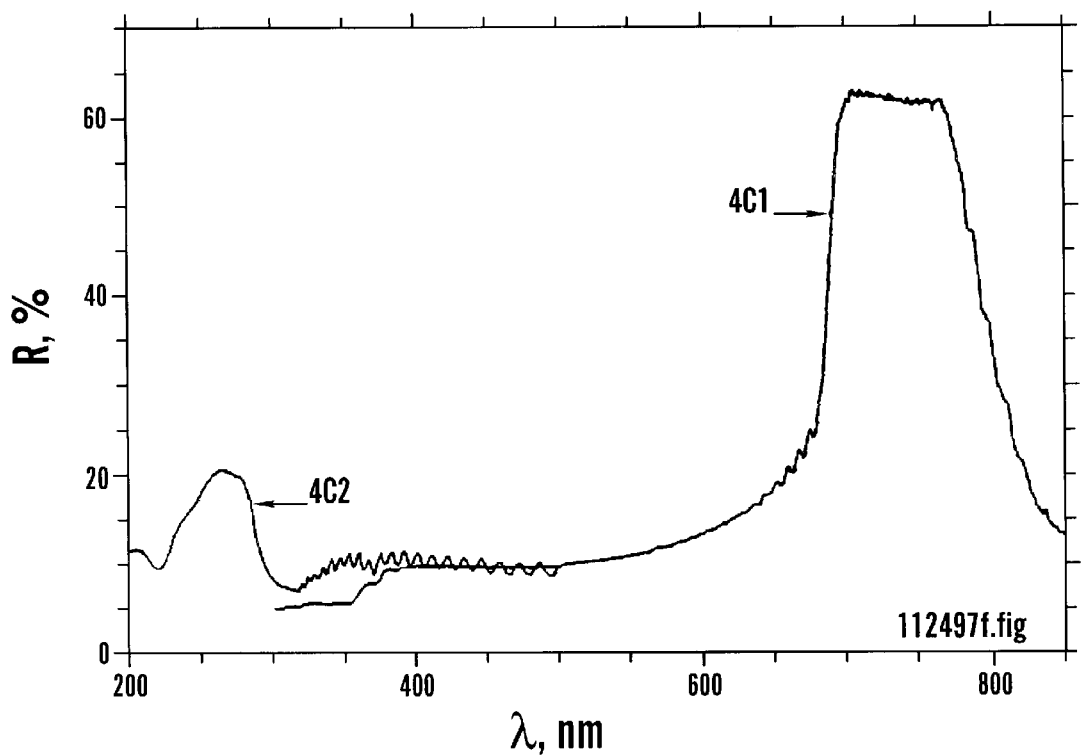
FIG. 4C shows experimental reflectance spectra of a third illustrative CLC film sample, according to the inventive process.

FIG. 4C shows experimental reflectance spectra of film samples prepared in accordance with the invented process. Curve 4C1 is the reflectance spectrum of a planar CLC film of the blend consisting of a BASF acrylate CLC polymer #181 (45% by weight), a chiral nematic (53% by weight) and a small amount of Ciba-Geigy photo-initiator Irgacure 184 (2% by weight). The chiral nematic itself consisted of Merck low-molecular-weight nematic liquid crystal E44 and chiral dopant R1011 (0.7% by weight). The film was 20 $\mu$m thick and was prepared in a similar manner described above. After the film sample was photo-polymerized with an UV lamp and one of the substrates was removed, the reflectance 4A1 was taken from the 'naked' film side. In the context of foregoing discussion, A was the BASF 181 polymer, B was the low-molecular chiral nematic. A film with the blend (A+B) was prepared. The B-component (the low-molecular-weight chiral nematic) was subsequently removed by dissolving with acetone, resulting in a CLC-like film with material component A only with the reflectance spectrum shown as curve 4C2. It is noted that center wavelength of the reflectance band was shifted from about 734 nm to about 265 nm. The reflectance of the processed film was reduced, due to material absorption in the UV spectral region.

Spatially Featured Phase-Retardation Devices

The aligned nematic film of the present invention may be used as a phase-retardation device. For a film with a birefringence $\Delta n$ and thickness L, the phase retardation for light having a wavelength $\lambda$ is given by $\Delta\phi=\Delta nL/\lambda$ and is typically expressed in units of $2\pi$. An example is a quarter-wavelength retardation device, with $\Delta\phi=(2N+\frac{1}{4})\pi$ where N is an integer. The quarter-wavelength retardation device is an optical device that changes a circularly polarized incident light into linearly polarized light after traversing the film and vice versa, in which a linearly polarized incident light is changed into circularly polarized after traversing. The phase retardation $\Delta\phi$ is strongly dependent on the wavelength $\lambda$, of incident light, so that a quarter-wavelength device 'perfectly' or optimally designed for $\lambda_1$ is not a 'perfect' quarter-wavelength device for $\lambda_2$. In such an instance, the light $\lambda_2$ transmitted from a quarter-wavelength device designed for $\lambda_1$ is elliptically polarized, instead linearly or circularly polarized. In other words, circularly polarized incident light of wavelengths $\lambda_1$ and $\lambda_2 \neq \lambda_1$ cannot be simultaneously transformed into linearly polarized light. Similarly, linearly polarized incident light of wavelengths $\lambda_1$ and $\lambda_2 \neq \lambda_1$ cannot be simultaneously transformed into circularly polarized light. The problem becomes more acute if the incident light is of broad band. A zero-order retardation device (N=0, where N is defined earlier for the quarter-wave device) is preferred over high N-order devices, but the former is typically more expensive. There are known means to 'achromatize' or substantially eliminate wavelength-dependence over a given range or a set of discrete wavelengths for the wave retardation devices, such as quarter-wavelength plates. However, these devices are typically complex, and for example, tend to require several birefringent layers in a stack.

Figure 5A:
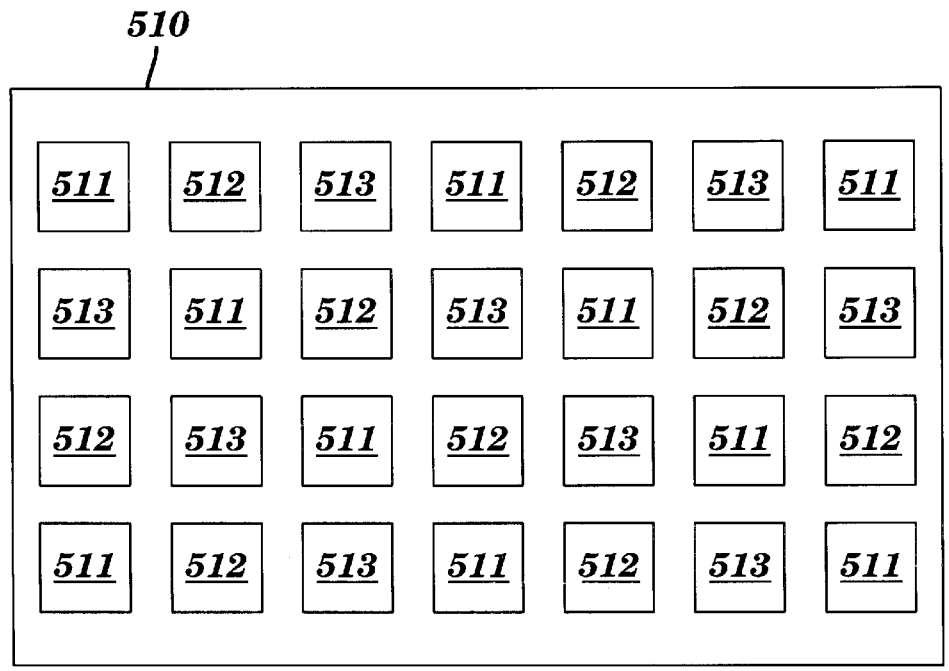
FIG. 5A shows a nematic-like film with phase retardation varied over zones fabricated with the present invention.

For some applications, such as for example, a color display utilizing a CLC filter, a display may be divided into spatial regions, for which the phase retardation film of the present invention is optimized to a particular spectral band. FIG. 5A illustrates such an optical device 510 having plural zones in a 'checker board' fashion, having zones 511 for red-color subpixels, zones 512 for green-color subpixels, and zones 513 for blue-color subpixels. Using the process disclosed hereinabove, a pixeled wave retardation film may be easily fabricated for a spectral band between $\lambda_1$ and $\lambda_2$, with a birefringence of $\Delta n$, by adding an appropriate material C for a subpixel such that, $\Delta nL/\lambda_{12}=\pi/4$, where $1/\lambda_{12}=(1/\lambda_1+1/\lambda_2)/2$, assuming intensity distribution is uniform over the spectral band. For example, the visible range (400–700 nm) may be divided into three so-called primary color bands: red (R) (607–700 nm), green (G) (510–607 nm) and blue (B) (400–510 nm) for RGB color subpixels. The $\lambda_{12}$'s 650, 554 and 448 nm, respectively, for the red, green and blue bands. For non-uniformly distributed spectral bands which are typically generated from a discharge lamp for an LCD display, $\lambda_{12}$'s may be chosen, for example, to be the mean value over the band weighted by lamp intensity-dependent distribution.

Spatially Featured Notch Filter Devices

Figure 5B:
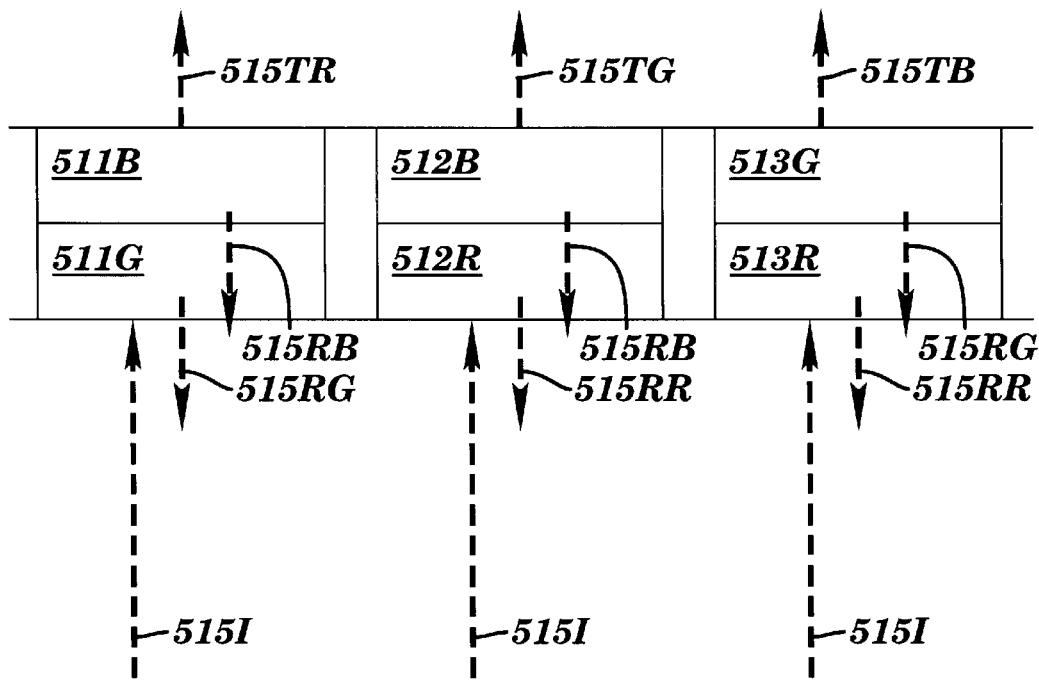
FIG. 5B is a cross-sectional view of a pixeled RGB color filter fabricated in accordance with the present invention.

The planar cholesteric film of the present invention may be used as a spatially featured notch or rejection filter device. By selectively reflecting a spectral component of the incident light beam, the filter has a rejection band centered at $\lambda_C=n_{av}P_0$ and a bandwidth $\Delta\lambda=\lambda_C(\Delta n/n_{av})$ and the circular polarization of the like-handedness of the film. For some applications, such as for example, a color display utilizing a CLC color filter, such a filter device has advantages over conventional absorptive color filter film used for liquid crystal displays, such as disclosed in Japanese reference No. 9-318807. In this example, the color filter film is divided into spatial regions, for which the filter of the present invention is optimized to a particular spectral band. It is more convenient to describe the rejection filter as a pass filter. For the visible incident light, it is convenient to divide the filter into three so-called primary color bands: a red-passing filter rejects the green and blue spectral components, a green-passing filter rejects the red and blue spectral components and a blue-passing filter rejects the red and green spectral components. Using FIG. 5A as an illustration, the optical device 510 may have plural zones in a 'checker board' fashion, having zones 511 of a red-passing filter, zones 512 of green-passing filter, and zones 513 of a blue-passing filter. The neighboring red, green and blue-passing filters constituting a pixel. Using the process disclosed hereinabove, a pixeled color filter film may be easily fabricated for primary colors, by adding an appropriate material C for a subpixel such that the red-passing filter has two subregions, one rejecting the green spectral component and the other rejecting the blue spectral component. FIG. 5B shows a cross-sectional view of the pixeled RGB color filter. The red-passing subpixel filter includes two sublayers 511G and 511B, rejects the green and blue spectral components 515RG and 515RB, respectively, of the incident 'white' circularly polarized light 515I. The transmitted light is circularly polarized red component 515TR. Similarly, the green-passing subpixel filters includes two sublayers 512R and 512B, and rejects the red and blue spectral components 515RR and 515RB, respectively, of the incident 'white' circularly polarized light 515I. The transmitted light is circularly polarized red component 515TG. The blue-passing subpixel filters consists of two sublayers 513R and 513G, rejects the red and green spectral components 515RR and 515RG, respectively, of the incident 'white' circularly polarized light 515I. The transmitted light is circularly polarized red component 515TB.

For those skilled in the art, variations of this filter structure may be implemented to achieve the same effect. For example, the red-passing filter may be a single layer (i.e., no sublayers), if its rejection band is broad enough to cover both the green and blue. In another example, instead of adding a different material C to opposite sides of the film, the filter may be fabricated as two distinct layers laminated together, each layer having subpixeled R-, G-, and B-rejection bands.

Dichroic Polarizers

Figure 6:
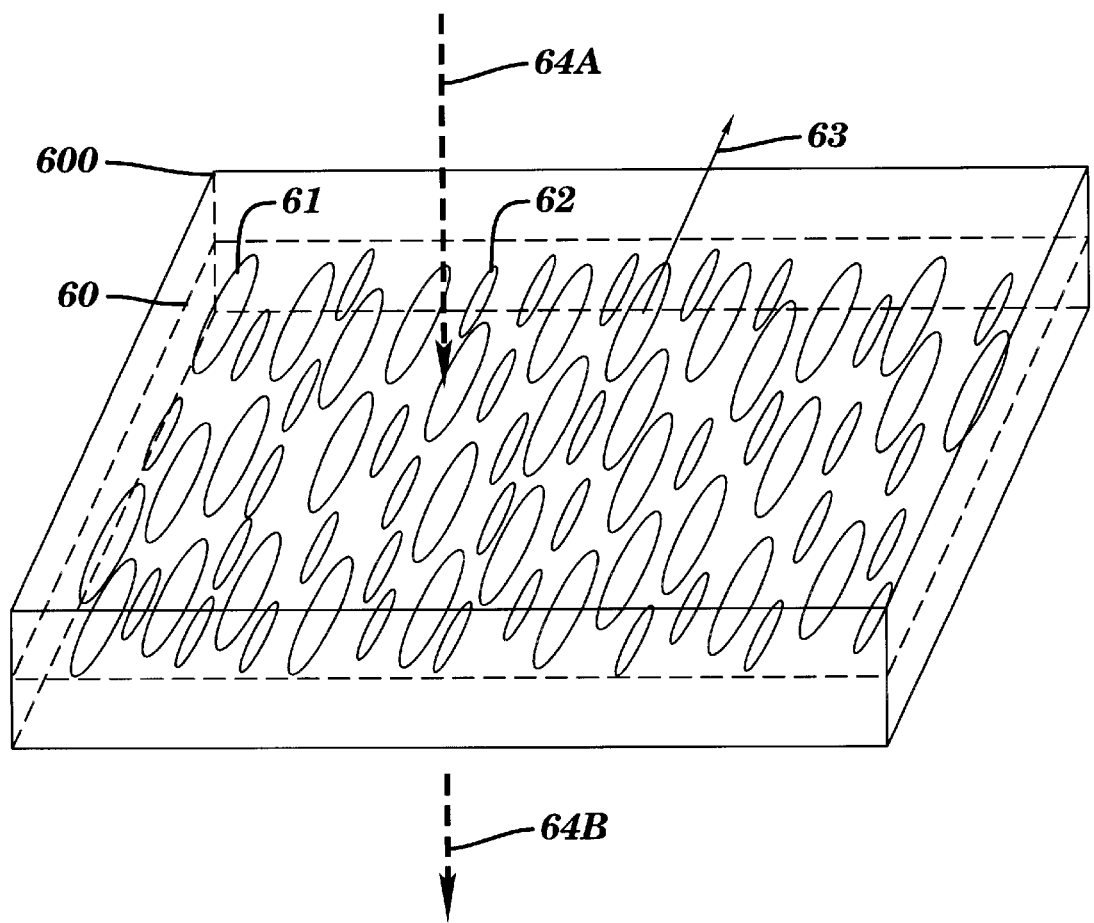
FIG. 6 shows a nematic-like film as an absorptive linear polarizer fabricated with the present invention.

The processes of the present invention may be utilized to fabricate dichroic polarizers using a nematic LC as the material A. It is known that films with aligned nematic LC doped with dichroic dyes may be used for an absorptive polarizer, due to its ability to absorb more strongly incident light of a particular polarization than the other, since the dye molecules are aligned in the film. Referring to FIGS. 2C, 2D and 2E, one of the added materials C and/or D (for example, material C indicated by 2C3 in FIG. 2C, material C indicated by 2D2 in FIG. 2D, material C indicated by 2E2 and material D indicated by 2E3 in FIG. 2E,) is optically absorptive. Since this material fills the sites (voids) vacated by the removed LC, the molecules of the material collect in elongated aggregations which simulate elongated LC molecules. In this manner, the added material C and/or is provided with LC-like molecular ordering. These aggregations thus exhibit optical characteristics similar to LC molecules, i.e., they absorb incident light of a particular polarization more strongly than the other, whereby the transmitted light has only one dominant polarization. The present approach is advantageous, as the inherent constraints with organic dichroic materials may be removed to result in a high-performance polarizer devices. For example, materials C and D may be chosen for their 'light fastness' (resistance to bleaching/decomposition as dichroic dyes do), broadband (a blend of absorptive materials showing a composite broadband absorption), wide spectral range (more absorptive materials over UV to IR spectral range are available, compared to special dichroic organic dyes) and high operating temperatures. FIG. 6 illustrates a dichroic polarizer 601, with a sectional view 501 showing the structure that includes material A 61 and material C 62. The director 63 is represented by an arrow. The incident light 64A is unpolarized and transmitted light 64B is substantially polarized perpendicular to the director, as the light component polarized in parallel to the director is substantially absorbed by material C.

Broadband Circular Polarizers

A single layer broadband circular polarizer may be obtained with certain cholesteric liquid crystal blends and polymerization, in the manner set forth in the above-referenced Li/Faris patent. Briefly described, such a polarizer may be fabricated with a CLC blend which includes a polymerizable CLC monomer and a non-reactive nematic liquid crystal or chiral nematic liquid crystal (a nematic liquid crystal with chiral dopant). The nematic liquid crystal or chiral nematic liquid crystal has limited temperature range as a liquid crystal phase. Thus, such a polarizer has a limited operating temperature range. Its upper limit is typically set by the nematic liquid crystal or chiral nematic liquid crystal (about 100° C.) rather than by the polymer matrix itself (about 200° C.). Furthermore, these nematic liquid crystal or chiral nematic liquid crystals are typically thermotropic, that is, the optical properties are strongly dependent on temperature. Thus, the characteristics of a polarizer using such a blend are relatively temperature sensitive.

Using the process of the present invention, such drawbacks may be overcome. In one example, a polymerizable CLC monomer may be utilized as the material A and a non-reactive nematic liquid crystal or chiral nematic liquid crystal as the material B. After an aligned CLC film is prepared and polymerized, the material B is removed from the film. Symbolically, (A+B)−B=A. The resulting film is fully polymeric which is CLC-like, that is, exhibits wavelength- and circular polarization-selective reflectance. The optical properties of the film are temperature-insensitive over a relatively large temperature range, particularly near the high limit. A further advantage of this process is that the removed material B may be recycled for subsequent use. This is particularly advantageous in the event a desired material B is available only from a limited number of suppliers and is thus relatively scarce and/or expensive.

Typically, the reflectance band of the resulting films are observed to have a narrower bandwidth and a shorter center wavelength than conventional devices. It also may be understood from the aforementioned relations $\lambda_C = n_{av} P_0$ and $\Delta\lambda/\lambda_C = \Delta n/n_{av}$, and from the definition of $n_{av}$ that the resulting films have a smaller $n_{av}$ (because of the voids). In this regard, for a film having two materials 1 and 2, the average refractive index is an average of the $n_{av}$ of each of the individual materials. Thus, for such a film, $n_{av} = c_1 n_{av1} + c_2 n_{av2}$ where $c_1$ and $c_2$ are weighted coefficients that are functions of the relative fractions of materials 1 and 2 and possibly of other material parameters. (The variables $n_{av1}$ and $n_{av2}$ are equal to $(n_e + n_o)/2$ for each of the materials 1 and 2, respectively, as discussed hereinabove.) If material 2 is replaced by voids, then the weighted average will be smaller, as voids (air) has a refractive index of 1 (which is a minimum).

The resulting film also has a smaller $\Delta n$ (due to the nulled contribution from material B after removal) and possibly smaller $P_0$ (due to film thickness shrinkage). Thus, for a circular polarizer with an engineered reflectance band, a film with a broader bandwidth and a longer center wavelength is first prepared. Those skilled in art will recognize that particular materials and their percent concentrations may be selected to optimize the LC blend for a desired reflectance band. The particular process steps used may also be selected, i.e., one or more of optional process steps 4–6 may be utilized, to obtain desired properties. For example, by filling voids with material C, a 'dense' (that is, no voids) film may be obtained. Such films may have some advantages, such as being more mechanically stable (due to increased rigidity), and more resistant to moisture (due to less surface area), etc.

Tunable Notch Filters

CLC-like films obtained in accordance with the present invention by symbolically (A+B)−B=A, where A is a resilient material, contain voids and are therefore mechanically compliant in the sense that when a pressure is applied on the surface on the film, the material compresses, so that the helical pitch (and possibly the average refractive index) is mechanically changed, thereby also changing the center wavelength of the reflectance band.

Figure 7:
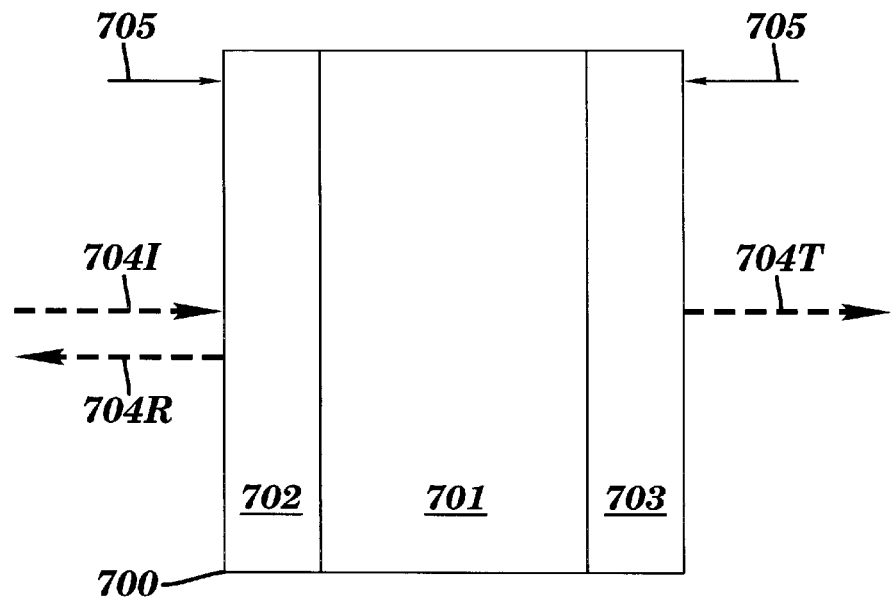
FIG. 7 illustrates a preferred embodiment of tunable notch filter fabricated with present invention.

Using this effect, the CLC-like films may be utilized as tunable notch filters. FIG. 7 illustrates a preferred embodiment of a tunable notch filter, using the structure fabricated by the CLC-like film processing of the invention. The notch filter 700 consists of a CLC-like film 701 sandwiched between two substrates 702 and 703. The substrates are provided for convenience to transmit pressure represented by arrows 705 on the CLC-like film. A circularly polarized light beam 704I is incident on the film. If the wavelength of the incident beam is within the reflectance band, the incident light is substantially reflected. The reflected beams is indicated by 704R. If the wavelength of the incident beam is outside the reflectance band, the incident light is substantially transmitted. The transmitted beam is indicated by 704T. (It is assumed the handedness of the CLC-like film is the same as the circular polarized state of the incident beam.) By applying a pressure on the film, the pitch changes and the reflectance band shifts and narrows. Thus, the transmission of the incident light (either transmitted or reflected) by the device may be controlled. Moreover, such tunable notch filters may also be used as pressure sensors. For example, shifts in the reflectance band of the filter may be used to determine changes in pressure being applied to the filter. It should be clear to one skilled in the art that stacking left-handed and right-handed CLC-like films with similar reflectance bands may form a switchable mirror that reflects or transmits unpolarized light.

Figure 8:
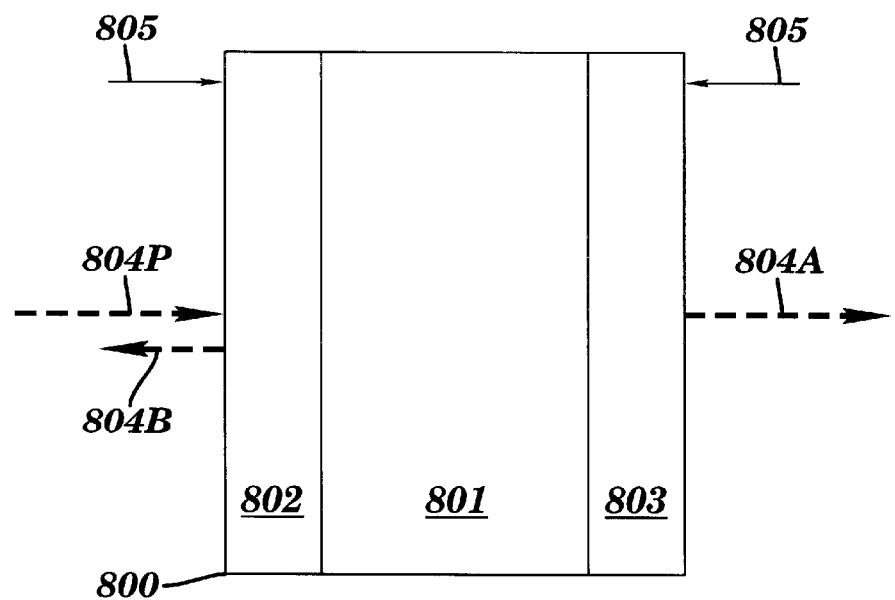
FIG. 8 illustrates a preferred embodiment of tunable dye laser fabricated with present invention.

If the CLC-like film is doped with laser dyes, in the manner discussed in our commonly assigned U.S. patent application Ser. No. 09/045,307, entitled "Solid State Dye Laser", the output wavelength of stimulated laser emission may be tuned. FIG. 8 illustrates a preferred embodiment of a tunable dye laser, using the structure fabricated by the CLC-like film processing of the present invention. The dye laser 800 consists of the dye-doped gain medium 801 sandwiched between two substrates 802 and 803. The substrates are provided for convenience to transmit pressure represented by arrows 805 on the dye-doped CLC-like film. The pump beam 804P is incident on the film and the stimulated emission emits in two directions normal to the film surface, represent by 804A and 804B. By changing the pitch of film (via pressure), the edge of the reflectance band changes, to change the output wavelength of the dye laser. Moreover, in addition to use as a tunable light source, this device also may be used as a pressure sensor. For instance, the output wavelength of the laser emission may be monitored to indicate the pressure applied to the device in a manner similar to the tunable notch filter described hereinabove. An added advantage of utilizing the tunable dye laser in this manner is that the monitored signal (the wavelength of the laser emission) is independent of the angle at which the pump beam is incident on the sensor. In the aforementioned example using the tunable notch filter without the laser dye, the reflectance band depends on the angle between the observer and film normal. A 'blue' shifting (a shorter center wavelength) is observed as the incidence angle increases.

Optical Storage Layers

It has been shown (i.e., in the Hikmet/Zwerver paper), that the shifting of the reflectance band, when a component of a CLC film is removed, may be used for optical data storage. Briefly, described, Hikmet and Zwerver utilize a chiral nematic material consisting of a polymerizable monomer nematic material and a non-reactive chiral dopant to prepare an aligned CLC film with a first center wavelength of a characteristic reflectance band. The chiral dopant is then locally removed by thermal evaporation at a high temperature (about 200° C.) using a focused laser beam, resulting in a reflectance band having a second center wavelength. The shifting in the reflectance band may thus be utilized to store digital data represented by binary states.

With CLC films prepared in accordance with the present invention, the data storage layers may have lower operating temperature and/or narrower reflectance bandwidth which results in more storage capacity when wavelength division multiplexing is used in a multilayer structure in the manner described in commonly assigned U.S. Pat. No. 5,353,247 to Faris entitled, "Optical Mass Storage System and Memory Cell Incorporated Therein" and U.S. Pat. Nos. 6,005,838 and 5,838,653 (November, 1998), by B. Fan and S. M. Faris, entitled "Multiple Layer Optical Recording Media and Method and System for Recording and Producing Information Using the Same." Referring to the film process steps symbolically by [(A+B)−B]+C, the particular material C may be chosen to be relatively volatile (to lower evaporation temperature), to provide a narrower second reflectance bandwidth, and/or larger shift between the first and second center wavelengths (by changing $\Delta n$ and/or $n_{av}$ after data recording). Those skilled in art will recognize that particular materials and their percent concentrations may be selected to optimize the LC blend for a desired reflectance band. The particular process steps used may also be selected, i.e., one or more of optical process steps 4–6 may be utilized, to obtain desired properties.

Turning now to FIGS. 9–13c, a method of producing composite NLO films with oriented NLO crystallites, which overcomes at least one of the aforementioned difficulties, is disclosed. The fabrication method is simple but novel. A polymeric host is preferably composed of a blend of cross-linkable and non-reactive low-molecular-weight (LMW) nematic liquid crystals. The self-ordering of liquid crystal molecules is used to align a small of amount of the 'guest' NLO molecules which is uniformly dissolved in the host material. Subsequently, electric field-poling is used to remove the centro-symmetry. It is known to those skilled in the art that magnetic field can be alternatively used, or corona-discharge. The NLO property is typically small, due to limited miscibility of the guest material. Further processing the host film, as discussed herein, may be used to enhance the optical nonlinearity. The non-reactive component of the film is removed, resulting in voids, which are of mesogenic scale. The voids are then filled with the nonlinear material, which subsequently forms crystallites. These crystallites are highly oriented, due to seeds embedded in the polymer matrix. The orientation of crystallites can be improved by field poling. Conventional thermal annealing may be used to reduce the defects of the film.

Figure 10A:
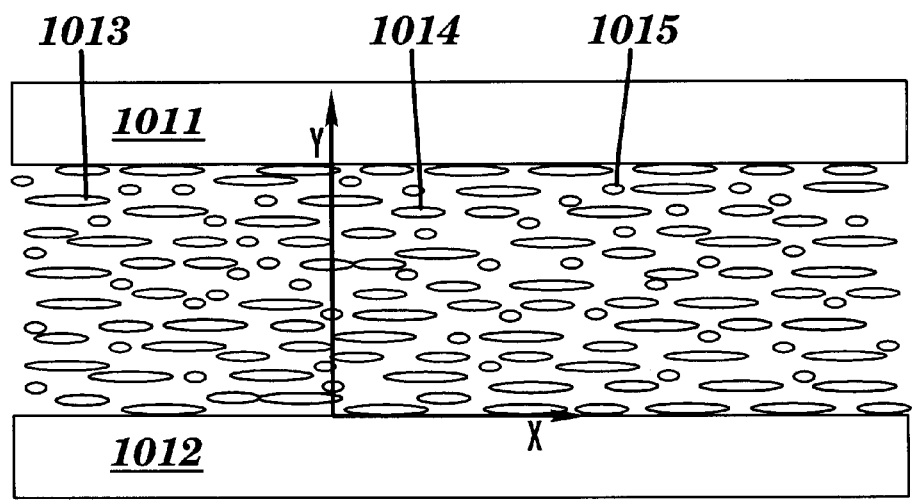
FIG. 10$a$ illustrates molecular orderings of nematic liquid crystal films used in the inventive method, in a planar texture in which the elongated molecules are aligned in parallel to each other and the film is optically anisotropic.

FIG. 10a shows a cross-section of a nematic liquid crystal (NLC) film in planar texture used preferably as the host. For the purpose of illustration, two substrates 1011 and 1012 are used. Preferred embodiments require only one substrate, for example, 1012. Typically, a NLC film is prepared using two substrates, with one of them being the desired substrate 1012, for example, a silicon wafer with electronic circuits disposed therein. After the film is prepared, the other substrate 1011, which can be a plain glass plate, is removed, leaving the NLC film on the desired substrate 1012. It is also possible to prepare a planar-textured film on the desired substrate, for example, using a doctor blade method. These techniques are well known to those skilled in the liquid crystal arts and therefore are not elaborated in detail. The film preferably includes a blend of a cross-linkable polymer (the molecules are indicated by 1013) and a non-reactive low-molecular-weight nematic (indicated by 1014), as well as a small amount of photo-initiator (not shown), typically a few percent by weight. The weight ratio of cross-linkable polymer to non-reactive component ranges for 5 to 95. Blends having a relatively high cross-linkable polymer concentration produce a film with less voids, which in turn, has relatively less NLO material content and lower NLO properties. The photo-initiator is used to initiate the polymerization (cross-linking) of the polymers to provide a stable network for the oriented NLO crystallites. The planar-textured film can be prepared using several well-known techniques. For example, the surface of the substrates in contact with the liquid crystal may be coated with a thin polyimide film (not shown). The coating is mechanically 'rubbed', i.e., with a nylon pile. The elongated liquid crystal molecules are aligned in the rubbing direction. It is also possible to prepare an alignment layer without mechanical rubbing, for example, using conventional optical radiation properly illuminated on a suitable thin coating on the contact surface. Alternatively, the contact surface may be obliquely deposited a thin silicon oxide film. These techniques are well known to those skilled in the liquid crystal arts and therefore are not elaborated further in detail. Due to molecular interactions minimizing the 'free energy', the elongated liquid crystal molecules are aligned substantially in parallel to each other along the rubbing direction (i.e., the x-axis). The film is positive uniaxial, with refractive indices $n_e$ (along the x-axis) and $n_o$ (along any direction in the yz-plane), $n_e > n_o$. The organic NLO molecules (indicated by 1015) are also aligned parallel to the host liquid crystal molecules, as evidenced by strong dichroism in the absorption spectrum (to be discussed with reference to FIGS. 12a and 12b).

Figure 9:
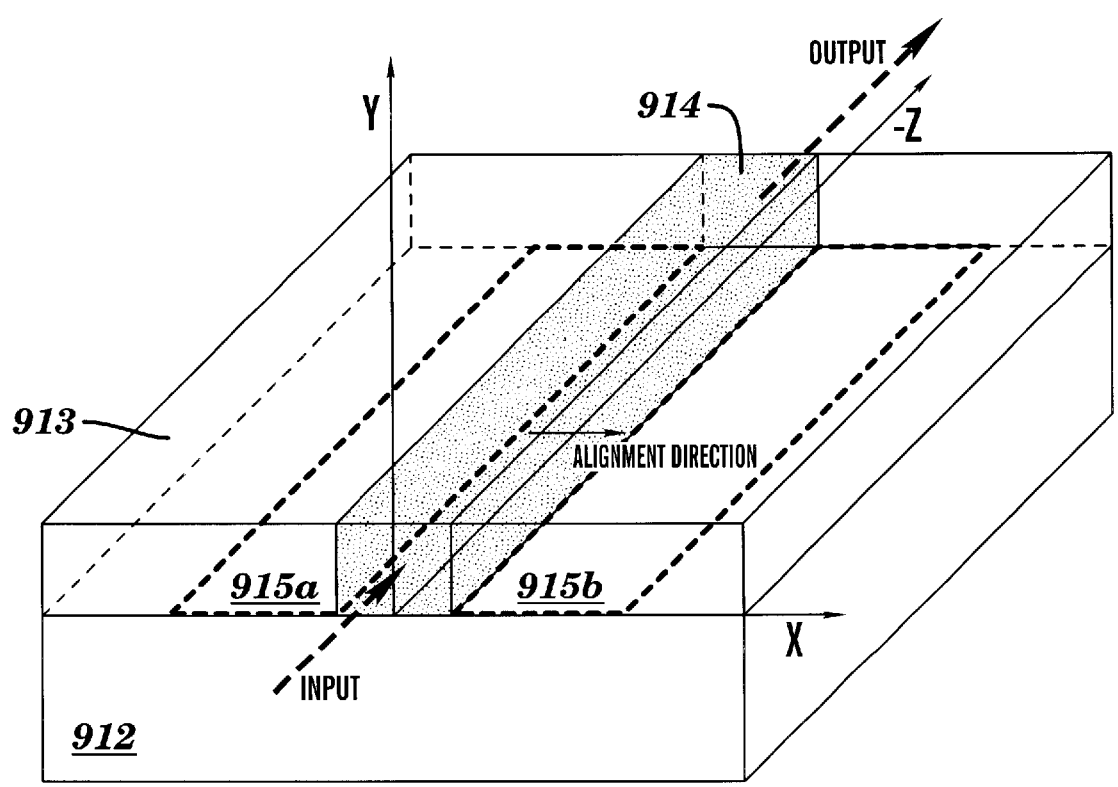
FIG. 9 illustrates a preferred embodiment of a NLO optical waveguide using the inventive method.
Figure 10B:
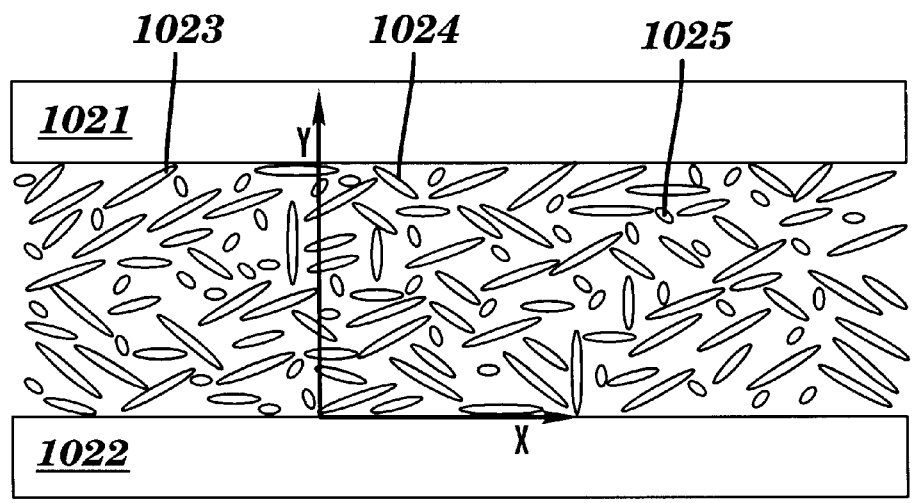

The nematic film can also be prepared in an isotropic state, such as shown in cross-section in FIG. 10b. The film may consist of the same composition as that shown in FIG. 10a: a blend of a cross-linkable polymer 1023 and a non-reactive low-molecular-weight nematic material 1024, photo-initiator (not shown), and organic NLO material 1025 between two substrates 1021 and 1022. In the isotropic state, the elongated liquid crystal molecules, as well as the organic NLO molecules are randomly aligned. The film is optically isotropic, with a refractive index $n_i=[(n_e^2+2n_o^2)/3]^{1/2}$, such that $n_e>n_i>n_o$. The isotropic state can be obtained by raising the temperature of the film to above the clearing temperature of the nematic blend. The LC material of the isotropic state has a lower refractive index and can be used as the cladding material for a waveguide structure in concert with a planar-textured region (to be discussed hereinbelow with reference to FIG. 9).

The advantage of using cross-linkable polymer now becomes apparent. Once polymerized, the orientation of the liquid crystal molecules is permanently fixed. The optical properties are insensitive to temperature up to glass transition temperature (300° C. for some polymers). It is thus possible to prepare planar-textured and isotropic regions on the same film to form waveguide structures by exploiting the differences in refractive indices (see discussion below).

Figure 11:
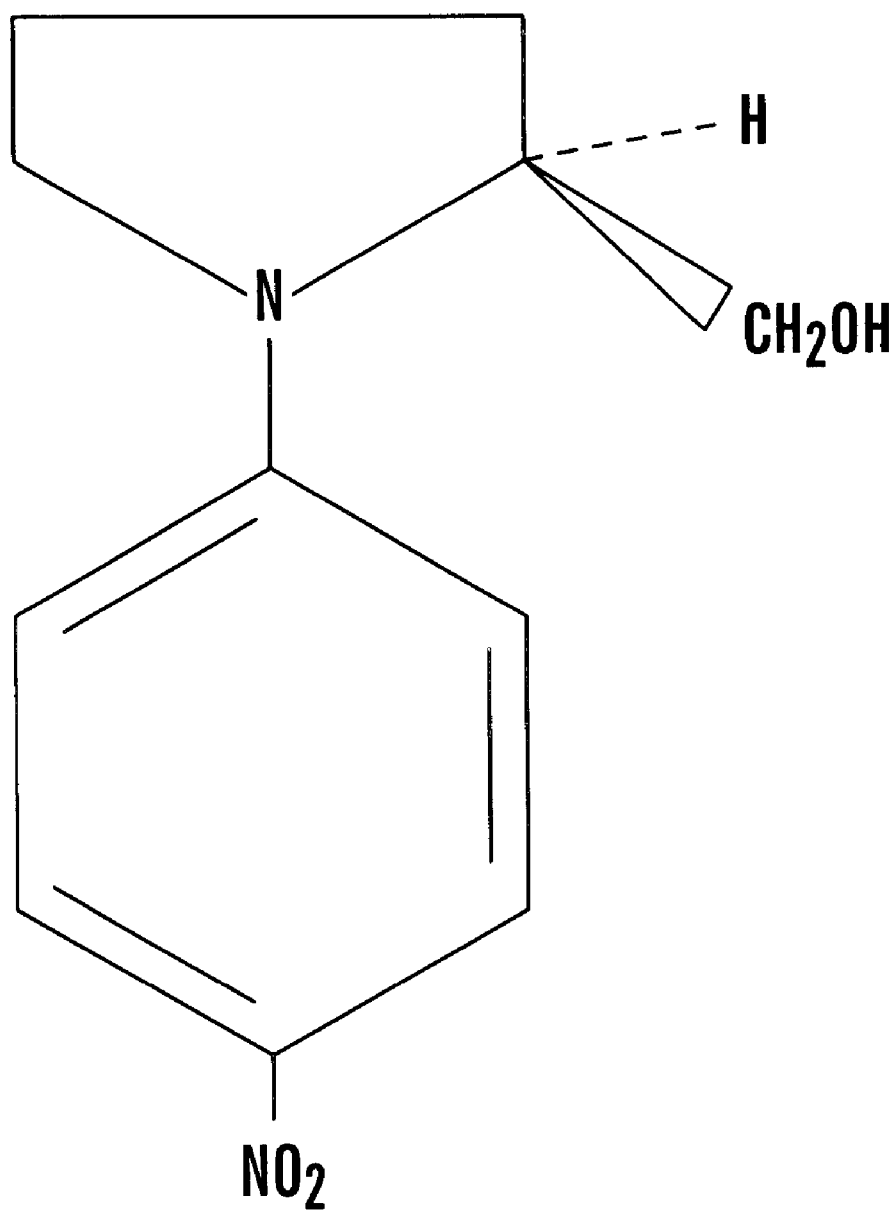
FIG. 11 illustrates molecular structure of an organic NLO material NPP, which is suitable as a guest material for the inventive method.

The LC film preparation process discussed hereinabove may be used to prepare NLO films by embedding nanocrystals of NLO materials within the processed host. The orientation of these nanocrystals can be chosen to have cooperative NLO effects that approach those exhibited by bulk crystals. As mentioned above, it is difficult to fabricate bulk crystal films suitable for waveguide devices. Subsequent processing for fabricating NLO film is now discussed, using a NLO material N-(4-nitrophenyl)-L-prolinol (NPP) as an illustrative example. FIG. 11 shows the molecular structure of the NPP. It has a molecular structure that is not symmetric along the $NO_2$-N axis. It naturally forms a monoclinic crystal with a large electro-optic coefficient.

Figure 12A:
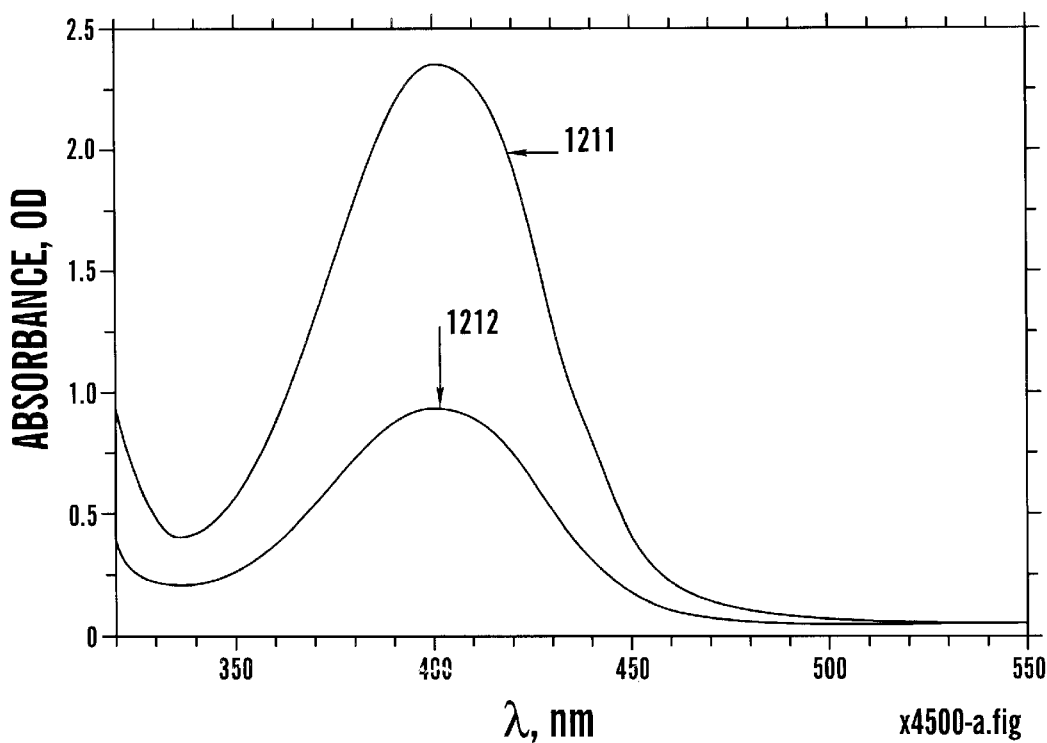
FIG. 12$a$ shows the absorption spectra of an NPP-doped nematic liquid crystal film having a liquid crystal ordering of a planar-texture film whose absorption is polarization-dependent.
Figure 12B:
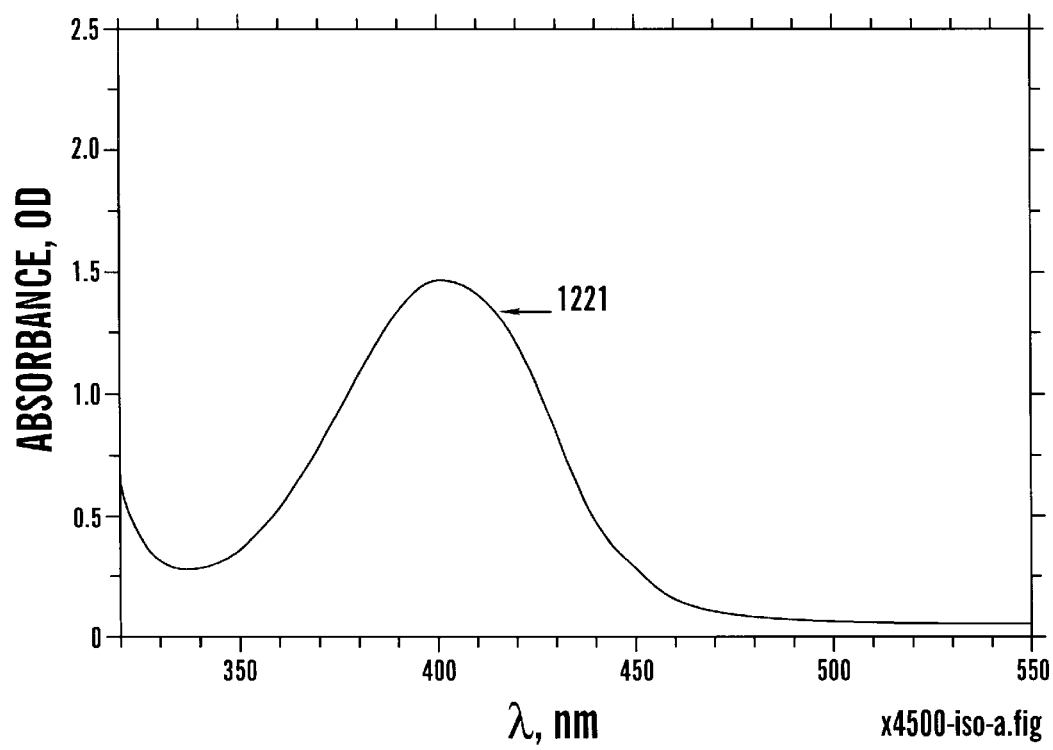

As a non-limiting example of a blend usable in the present invention includes a NLC blend, consisting of crosslinkable CM428 (from BASF, Ludwigschiffen, Germany), and LMW nematic E44 (from EMI, Hawthorne, N.Y.) in a weight ratio of 4:10 is mixed with about 1% (by weight) of photo-initiatot Irgacure 184 (from Ciba-Geigy, Tarrytown, N.Y.). The blend is then incorporated with the NLO material NPP (from Sigma/Aldrich Corp, Milwaukee, Wis.). The NPP has a low miscibility in the liquid crystal blend, estimated to be under 1% by weight. Films of 2.5 $\mu$m thick are then prepared with this mixture, using conventional techniques aforementioned. FIGS. 12a and 12b display the absorption spectra of NPP-doped NLC films prepared in the planar texture (see FIG. 10a) and in the isotropic state (see FIG. 10b). For the planar-textured film, which is cured at room temperature, the absorption displays dichroism due to orientational ordering of guest NPP molecules. The absorption of incident light polarized in parallel to the rubbing direction of the alignment layer (indicated by 1211) is 27 times stronger than the absorption of light polarized perpendicular to the rubbing direction (indicated by 1212). On the other hand, for the isotropic film, which is cured at 100° C. (above the clearing temperature of the LC blend), the absorption does not exhibit dichroism (indicated by 1221). The absorption is independent of the polarization state of incident light, i.e., the absorption spectra are indistinguishable for light polarized parallel and perpendicular to the rubbing direction. This indicates that NPP molecules, like the liquid crystal molecules, are randomly aligned.

It is well-known that the elongated liquid crystal molecules are self-aligned approximately in parallel with each other along the rubbing direction. This is only a long-range orientational ordering, in the sense that the 'head' of the liquid crystal molecules do not all point in the same direction. It is assumed that the liquid crystal molecules are not symmetric along the long molecular axis, the ends of the molecules identified as 'head' and 'tail' of an 'arrow.' Therefore, the molecules are usually not vector-aligned, i.e., they may point in generally opposite directions. Experimental results indicate that the guest NLO molecules, though generally aligned with the same longitudinal axis as that of the host liquid crystal molecules, are also not vector-oriented. The resulting film has a centro-symmetry, which is unsuitable for electro-optic application (i.e., applications in which an electric field is applied to impart a phase retardation to the optical beam) and others such as optical second harmonic generation (converting incident light to another with its spectral frequency doubled), wavelength up- or down-conversion (converting incident light of two different wavelengths f1 and f2, to another wavelength f3 being a sum f3=f1+f2 or difference f3=f1−f2, thereof) or parametric oscillation (converting incident light to two output beam of two different wavelengths) or optical rectification (converting incident light to electrical) and other nonlinear optical processes. It is advantageous to provide structures in which the host molecules are vector-aligned and the NLO molecules are vector-aligned through inter-molecular interaction.

Figure 13A:
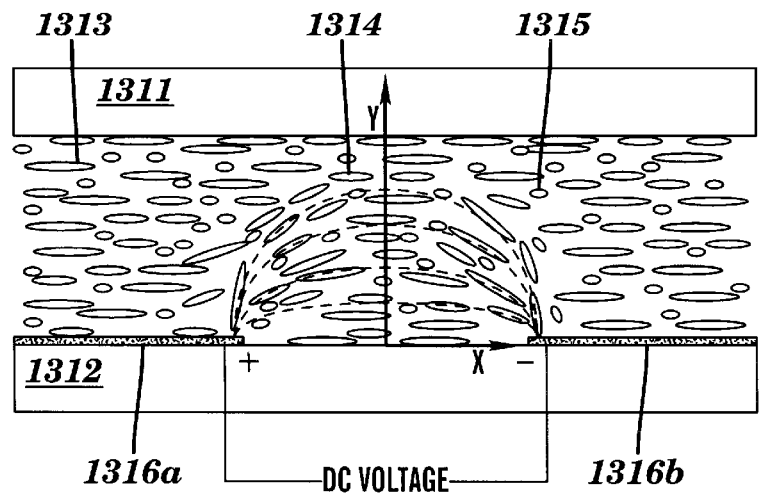
FIGS. 13$a$–13$c$ show graphically various steps in the removal of centro-symmetry and nonlinearity enhancement techniques used in the present invention.
Figure 13B:
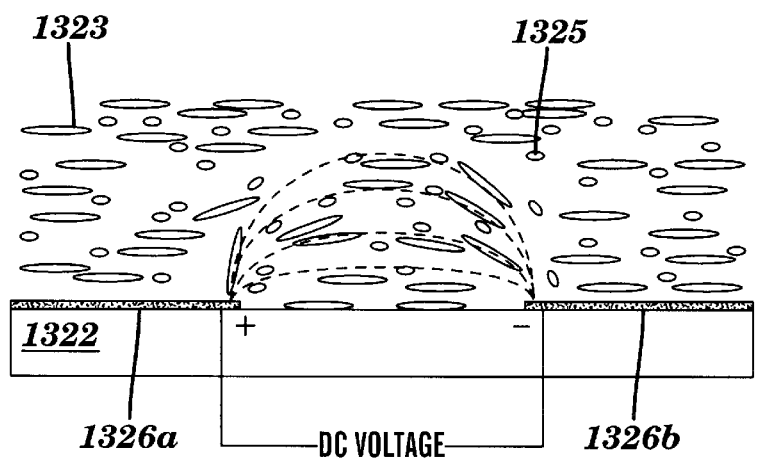

It is thus desirable to vector-orient the NLO molecules by some means to remove this centro-symmetry. Electric field poling that is used for poled NLO polymer films can be used for this purpose. FIG. 13a shows a preferred poling geometry. This cross-sectional view shows a nematic liquid crystal (NLC) film between two substrates 1311 and 1312. The film consists of a blend of a cross-linkable polymer (molecules 1313) and a non-reactive low-molecular-weight nematic (molecules 1314), a photo-initiator (not shown), and organic NLO material (the molecules 1315). The film is of planar texture, with the alignment direction in the x-axis. The alignment is achieved by rubbing the polyimide coating (not shown) on substrates or other techniques as aforementioned. For electric field poling, a pair of electrodes 1316a and 1316b are deposited on the substrate 1312. Typically, the electrodes are strips of metal films, separated by a gap. The conductive strips can be either optically semi-transparent such as indium tin-oxide (ITO) or opaque (gold, aluminum, chromium, or others). The choice of electrode material depends on the particular application, with engineering considerations including that it have an acceptable absorption loss at the working wavelength of the light and is compatible with the device into which it is to be incorporated. The electrode configuration depicted is commonly called in-plane, i.e., the electrodes are oriented in parallel with the plane of substrate 1312. Such configuration is advantageous, as the same electrodes can be used for electro-optic devices.

Figure 13C:
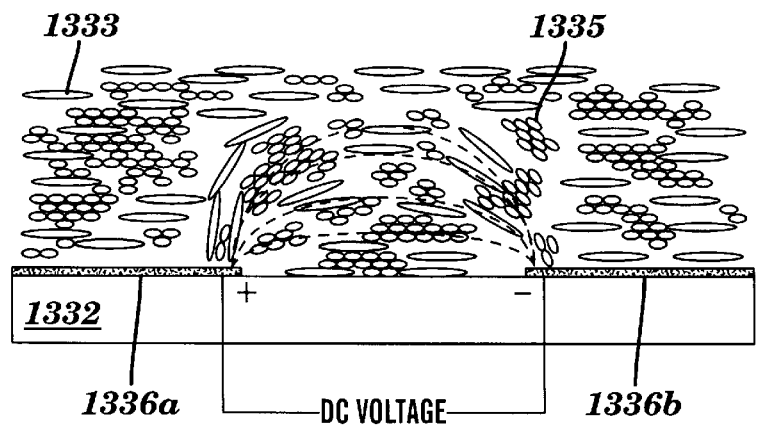

For poling, a DC electrical voltage is applied across the two in-plane electrodes 1316a and 1316b. At least two effects of this field poling occur. A first effect is that the nematic liquid crystal molecules are aligned along the electric field, the field lines being indicated by the dashed lines, instead of parallel to the substrate plane as shown in FIG. 10a. The mobility of liquid crystal molecules is fairly high, as the host blend is formulated to contain low-molecular-weight nematics that are field-effected. In addition, the film temperature during poling is high, preferably close to but below the clearing temperature, so the viscosity is generally lower. A second effect is that the NLO molecules are also re-oriented along the liquid crystal molecules. These NLO molecules are also vector-aligned, that is, in a preferred direction, owing to their relatively large molecular dipole moment. An electric field strength of 25 V/$\mu$m appears sufficient for the poling. The temperature of the film is gradually reduced to room temperature with the poling field applied. Then the film is polymerized to preserve the vector ordering of NLO molecules. The non-reactive component is then removed, such as discussed hereinabove with respect to FIGS. 1–8. The processed films shown in FIG. 13b, which have voids, have a large electro-optic coefficient (due to vector-alignment after poling) and good temporal stability (in a structurally ordered LC polymer host). The film nonlinearity can be further enhanced by filling the voids vacated by the non-reactive LC host material with the same NLO material. The films show much higher absorption due to increased NLO material content in the film. For film samples discussed, the absorption was increased by a factor of more than 1,000 at 400 nm. The NLO material in the voids tends to form nano-crystallites, as the NLO molecules are much smaller than the non-reactive LC molecules. These NLO molecules are clustered together in the voids and tend to form crystallites within. These crystallites can be vector-aligned using the remaining NLO molecules in the polymeric matrix as the seeds. Field poling can also be used to improve the vector-orientation of the crystallites. This can be done applying a DC electric field across the poling electrodes, as shown in FIG. 13c. It is advantageous to orient the NLO crystallites during their formation (during solvent evaporation if a solution is used to fill the voids). It is also advantageous to improve the crystallites by applying a poling field through temperature cycling. Due to cooperative interactions between the oriented crystallites, the NLO properties of such processed films are much higher, and can approach those of the bulk organic crystals.

The above teaching uses NPP as an illustrative example. Substantially any other NLO organic materials that form crystals, which are currently available or may be synthesized in the future, are suitable. For example, the following is a partial list of organic compounds that composite NLO films: 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methy-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (-)2-($\alpha$-methylbenzylamino)-5-nitropyridine (MBANP), 2-adamantylamino-5-nitropyridine (AANP), (-)-4-(4'-dimethylamino-phenyl)-3-(2'-hydroxypropylamino)cyclobutene-1,2-dione (DAD), 1-(2-thienyl)-3-(4-tolyl)propene-1-one (T-17), 3-(4-dimethyl-aminophenyl)-1-(4-cyanophenyl)-phenyl)-2-propene-1-one (DACC), 4-bromo-4'-methoxy-chalcone (BMC), 4-methoxy-4'-ethoxychalcone (MEC).

The composite NLO films are more useful if optical waveguide devices can be fabricated. The optical waveguides are dielectric structures, such that light propagation is confined. Examples of such waveguides include conventional optical fiber. Typically, the guiding core, which has the most optical energy confined therein, has a higher refractive index than that of the surrounding. As discussed hereinabove, the planar film (i.e., core) is optically uniaxial with refractive indices $n_e$ (along the alignment direction) and $n_o$. The isotropic film (i.e., cladding) has a refractive index $n_i$, such that $n_e > n_i > n_o$. To form a light guiding structure, the core is preferably of material in the planar texture having a higher refractive index $n_e$ (for light polarized along the liquid crystal alignment direction) and the cladding should consist of material in the isotropic state having a lower refractive index $n_i$. This configuration may be obtained by UV exposure through a photomask or by direct laser beam writing. As an illustrative example, FIG. 9 shows a channel waveguide for transverse-electric (TE) input. (The skilled artisan will recognize that TE is a classification of propagating modes, commonly used in waveguide theory. TE modes are those with an electrical field in the xz-plane, while TM are those with magnetic field in the xz-plane.modes.)

Ridge and channel waveguide structures may be prepared easily using standard lithographic methods. Briefly described, a planar-textured film with its molecular alignment along the x-axis is prepared on the substrate 912, and a narrow strip (or strips) 914 thereof is polymerized to provide the light guide. The remaining, unpolymerized portions of the film are then polymerized to form the cladding or surrounding region 913 disposed in the isotropic state by raising the film temperature to above the so-called 'clearing temperature.' The skilled artisan will recognize that the 'clearing temperature' is the temperature at which the liquid crystal blend is in the liquid phase, which is typically in the range of 50–200° C. Additional processing may be effected, i.e., using embedded electrodes 915a and 915b for poling, during the above described polymerization steps, and/or as discussed above in connection with FIG. 13.

Alternatively, the unpolymerized material surrounding strip(s) 914 may be removed to form a ridge waveguide (the cladding in this case consists of air and the substrate), or may be filled with another material as cladding. The removal of unpolymerized liquid crystal may be achieved using a suitable solvent such as acetone. Suitable other cladding materials are widely available, one example being a UV-curable epoxy. An advantage of this approach is that the refractive index of the cladding may be smaller than that of the core, i.e., $n_i < n_e$ and $n_i < n_o$, thereby supporting both TE and TM modes. By rubbing in different directions, non-parallel waveguides may be fabricated on the same substrate. It is noted that the rubbing technique as described is for illustration. Many techniques well-known in the liquid crystal display (LCD) industry may be adapted for this purpose. For example, polarized light may be used to align nematic LC cells, providing the capability for direct-writing waveguide devices. Optionally, an optical coating may be added on top of the waveguide structures for protection against environmental effects or mode control (i.e., by controlling the difference in the refractive indices of the core and cladding) or multi-layered waveguide structures (with interlayers as substrate or superstrate). It is clear that NLO films may be made on any substrate, including silicon wafers with electronic devices. This allows the integration of electronic driver circuit with electro-optic devices.

In summary, the composite NLO films disclosed in the present invention have the following distinct advantages over prior-art technologies:

Large nonlinearity due to oriented crystallites of high-performance NLO material(s) imbedded in the film;

Fast switching speed due to use of NLO organic material incorporated therein;

High thermal stability and long temporal stability due to the polymeric host; and Processibility into low-loss waveguide devices with conventional techniques due to cross-linkable liquid crystal polymeric host material characteristics.

The foregoing description is intended primarily for purposes of illustration. Although the invention has been shown and described with respect to exemplary embodiments thereof, it should be understood by those skilled in the art that the foregoing and various other changes, omissions, and additions in the form and detail thereof may be made therein without departing from the spirit and scope of the invention.

What is claimed is:

1. An ordered optical film structure fabricated by the steps of:
   (a) providing a first material and a second material which are substantially non-reactive relative to one another, at least one of said first material and said second material being a liquid crystal;
   (b) combining the first material with the second material to form a blend;
   (c) forming a film with the blend, the film having a molecular ordering defined by the liquid crystal;
   (d) freezing the molecular ordering of the film;
   (e) removing one of said first material and said second material to form a matrix having a plurality of sites interspersed therethrough and a liquid crystalline molecular ordering; and
   (f) introducing a third material to the plurality of sites, the third material being a nonlinear optical (NLO) material.

2. The film structure of claim 1, wherein said NLO material comprises a material that forms crystals which generate a responsive output that is disproportionate to an electro-magnetic radiative input.

3. The film structure of claim 2, wherein said NLO material is selected from the group consisting of 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (-)2-(α-methylbenzylamino)-5-nitropyridine (MBANP), 2-adamantylamino-5-nitropyridine (AANP), (-)-4-(4'-dimethylamino-phenyl)-3-(2'-hydroxypropylamino)cyclobutene-1,2-dione (DAD), 1-(2-thienyl)-3-(4-tolyl)propene-1-one (T-17), 3-(4-dimethylaminophenyl)-1-(4-cyanophenyl)-phenyl)-2-propene-1-one (DACC), 4-bromo-4'-methoxychalcone (BMC), and 4-methoxy-4'-ethoxychalcone (MEC).

4. The film structure of claim 1, further comprising the step of applying an electro-magnetic field to the film during said freezing step (d) to orient molecules of the film.

5. The film structure of claim 4, further comprising the step of applying an electro-magnetic field to the film during said introducing step (f).

6. The film structure of claim 1, wherein said combining step (b) further comprises adding an NLO material to the first material and the second material.

7. The film structure of claim 1, further comprising the step of crystallizing the NLO material.

8. The film structure of claim 1, wherein the matrix comprises a liquid crystal and has a liquid crystalline molecular ordering.

9. The film structure of claim 1, wherein the matrix comprises a non-liquid crystal and the plurality of sites has a liquid crystalline molecular ordering.

10. The film structure of claim 9, wherein the third material has a liquid crystalline molecular ordering.

11. The film structure of claim 1, wherein said freezing step (d) further comprises changing the temperature of the film.

12. The film structure of claim 1, wherein at least one of said first material and said second material is polymerizable and said freezing step (d) further comprises polymerizing the blend.

13. The film structure of claim 1, wherein the liquid crystal comprises a nematic liquid crystal and the film structure exhibits an ordering providing optical birefringence.

14. The film structure of claim 1, wherein the liquid crystal comprises a nematic liquid crystal and the film structure exhibits an ordering providing phase-shift transmittance.

15. The film structure of claim 1, wherein the third material is frozen.

16. The film structure of claim 15, wherein the third material is polymerizable and is frozen by polymerization.

17. The film structure of claim 16, further comprising the step of (g) removing the one of said first material and said second material to provide a second series of sites interspersed within the film structure.

18. The film structure of claim 17, further comprising the step of (h) introducing a fourth material to the second series of sites interspersed within the film structure.

19. The film structure of claim 18, wherein the fourth material is a non-liquid crystal provided with a liquid crystalline molecular ordering.

20. The film structure of claim 1, wherein said matrix further comprises a plurality of zones disposed in spaced relation along the film plane, at least two of said plurality of zones having discrete optical properties relative to one another.

21. The film structure of claim 20, wherein each of the plurality of zones is adapted to transmit light within a characteristic wavelength and polarization.

22. An ordered optical film structure comprising:
    a substrate;
    a material disposed on said substrate;
    said material being a nonlinear optic (NLO) material having a liquid crystalline molecular ordering; and
    said material further including a plurality of sites interspersed therethrough.

23. The ordered optical film structure of claim 22, wherein said liquid crystalline molecular ordering further comprises a nematic ordering providing phase-shift transmittance.

24. The ordered optical film of claim 22, further comprising a second material disposed in said plurality of sites.

25. The ordered optical film of claim 24, wherein said second material is selected from the group consisting of nematic liquid crystals, liquid crystals, non-liquid crystals, and combinations thereof.

26. An ordered optical film structure fabricated by the steps of:
    (a) providing a liquid crystal, a non-liquid crystal, and a nonlinear optical material (NLO), which are substantially non-reactive to one another;
    (b) combining the liquid crystal with the non-liquid crystal and the NLO material to form a blend;
    (c) forming a film with the blend, the film having a molecular ordering defined by the liquid crystal;
    (d) applying an electromagnetic field to the film to orient molecules of the film;
    (e) while effecting said applying step (d), freezing the molecular ordering of the film;
    (f) removing one of the liquid crystal and the non-liquid crystal to form a matrix having a plurality of sites interspersed therethrough and having a liquid crystalline molecular ordering; and
    (g) introducing a non-linear optical (NLO) material to the plurality of sites.

27. The film structure of claim 26, further comprising the step of applying the electro-magnetic field to the film during said introducing step (g).

28. The film structure of claim 26, wherein said removing step (f) comprises the step of removing the non-liquid crystal wherein the matrix comprises a liquid crystal and has a liquid crystalline molecular ordering.

29. The film structure of claim 26, wherein said removing step (f) comprises the step of removing the liquid crystal wherein the plurality of sites has a liquid crystalline molecular ordering.

30. The film structure of claim 26, wherein the NLO material has a liquid crystalline molecular ordering.

31. The film structure of claim 26, being disposed on a substrate.

32. The film structure of claim 31, wherein said substrate comprises a silicon wafer.

33. The film structure of claim 32, wherein said substrate comprises electronic components integrated therein.

34. The film structure of claim 33, wherein said electronic components comprise electrodes.

35. The film structure of claim 26, being disposed between a pair of substrates.

36. The film structure of claim 26, comprising an optical waveguide.

37. The film structure of claim 26, comprising a core disposed adjacent to a cladding material, said cladding material being optically isotropic and having an index of refraction lower than an index of refraction of said core.

38. The film structure of claim 37, wherein molecules of said core are extend in an axial direction, said core having a refractive index $n_e$ for light polarized along the axial direction, and a refractive index $n_o$ for light polarized orthogonally to the axial direction, said cladding material having a refractive index $n_i$, wherein $n_e > n_i > n_o$.

39. The film structure of claim 38, being formed by lithography.

40. The film structure of claim 39, being formed by UV exposure through a photomask.

41. The film structure of claim 38, being formed by direct laser beam writing.

42. The film structure of claim 38, being formed by the steps of:
    (h) effecting said steps (a) through (g) to form said core;
    (i) heating said core to above its clearing temperature;
    (j) applying a cladding material adjacent to said core; and
    (k) polymerizing the cladding material to form said cladding.

43. The film structure of claim 26, wherein an electric field applied thereto imparts a phase retardation to an optical beam passing therethrough.

44. The film structure of claim 26, comprising a spectral converter.

45. The film structure of claim 44, comprising an optical harmonic generator wherein the spectral frequency of light exiting therefrom is a harmonic of incident light.

46. The film structure of claim 26, comprising a second harmonic generator.

47. The film structure of claim 26, comprising a wavelength converter, wherein incident light of a plurality of discrete wavelengths is converted to an other wavelength being a sum or difference of the plurality of discrete wavelengths.

48. The film structure of claim 26, comprising a parametric oscillator, wherein incident light of a frequency f1 is converted to an output having frequencies of f2 and f3, where f1=f2+f3.

49. The film structure of claim 26, comprising an optical rectifier, wherein incident light is converted to an electrical output.

* * * * *